US011860846B2

(12) United States Patent
Gonzalez Aguirre et al.

(10) Patent No.: US 11,860,846 B2
(45) Date of Patent: Jan. 2, 2024

(54) METHODS, SYSTEMS AND APPARATUS TO IMPROVE SPATIAL-TEMPORAL DATA MANAGEMENT

(71) Applicant: Intel Corporation, Santa Clara, CA (US)

(72) Inventors: David I. Gonzalez Aguirre, Hillsboro, OR (US); Ignacio J. Alvarez, Portland, OR (US); Javier Felip Leon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/228,864

(22) Filed: Apr. 13, 2021

(65) Prior Publication Data
US 2022/0067012 A1    Mar. 3, 2022

Related U.S. Application Data

(63) Continuation of application No. 16/326,878, filed as application No. PCT/US2016/068382 on Dec. 22, 2016, now Pat. No. 10,990,570.

(51) Int. Cl.
G06F 16/22       (2019.01)
G06F 16/2458     (2019.01)
G06F 16/23       (2019.01)

(52) U.S. Cl.
CPC ...... *G06F 16/2264* (2019.01); *G06F 16/2246* (2019.01); *G06F 16/2365* (2019.01); *G06F 16/2477* (2019.01)

(58) Field of Classification Search
CPC ............. G06F 16/2264; G06F 16/2246; G06F 16/2477; G06F 16/2365

(Continued)

(56) References Cited

U.S. PATENT DOCUMENTS 6,510,435 B2 *   1/2003   Bayer ................. G06F 16/2246
                                              707/999.102
6,526,176 B1 *   2/2003   Kovacevic ............... G06T 9/40
                                              382/240

(Continued)

FOREIGN PATENT DOCUMENTS

CN        1684109 A       10/2005
WO        2015096582      7/2015

OTHER PUBLICATIONS

International Searching Authority, "International Search Report," issued in connection with International Patent Application No. PCT/US2016/068382, dated Sep. 22, 2017, 3 pages.

(Continued)

*Primary Examiner* — Joshua Bullock
(74) *Attorney, Agent, or Firm* — Hanley, Flight & Zimmerman, LLC

(57) ABSTRACT

Methods, apparatus, systems and articles of manufacture are disclosed to improve spatial-temporal data management. An example apparatus includes a hypervoxel data structure generator to generate a root hexatree data structure having sixteen hypernodes, an octree manager to improve a spatiotemporal data access efficiency by generating a first degree of symmetry in the root hexatree, the octree manager to assign a first portion of the hypernodes to a positive temporal subspace and to assign a second portion of the hypernodes to a negative temporal subspace, and a quadtree manager to improve the spatiotemporal data access efficiency by generating a second degree of symmetry in the root hexatree, the quadtree manager to assign respective hypernodes of the positive temporal subspace and the negative temporal subspace to respective positive and negative spatial subspaces.

21 Claims, 10 Drawing Sheets

(58) Field of Classification Search
USPC .......................................................... 707/696
See application file for complete search history.

(56) References Cited

U.S. PATENT DOCUMENTS

| 10,990,570 | B2  |   | 4/2021  | Gonzalez Aguirre et al. |
|---|---|---|---|---|
| 2002/0091704 | A1 | * | 7/2002  | Bayer .................. G06F 16/2264 |
| 2004/0220965 | A1 | * | 11/2004 | Harville ................... G06F 16/40 |
|   |   |   |         | 707/E17.031 |
| 2006/0167917 | A1 | * | 7/2006  | Solomon .............. G05B 19/418 |
| 2019/0197029 | A1 |   | 6/2019  | Gonzalez Aguirre et al. |
| 2021/0058506 | A1 | * | 2/2021  | Chen ...................... H04W 4/029 |

OTHER PUBLICATIONS

International Searching Authority, "Written Opinion," issued in connection with International Patent Application No. PCT/US2016/068382, dated Sep. 22, 2017, 5 pages.

Shen et al., "A Fast Volume Rendering Algorithm for Time-Varying Fields Using a Time-Space Partitioning (TSP) Tree," Proceedings of Visualization '99, Oct. 24-29, 1999, 7 pages.

He et al., "Decomposition Tree: A Spatio-Temporal Indexing Method for Movement Big Data," Cluster Computing, vol. 18, No. 4, Dec. 2015, 12 pages.

Fu et al., "QR-Tree: A Hybrid Spatial Index Structure," Proceedings of the Second International Conference on Machine Learning and Cybernetics, Nov. 2-5, 2003, 5 pages.

Su et al., "Calibrating Trajectory Data for Spatio-Temporal Similarity Analysis," The VLDB Journal, vol. 24, No. 1, Feb. 2015, pp. 93-116.

European Patent Office, "Extended European Search Report," mailed in connection with European Patent Application No. 16924445.6, dated Apr. 6, 2020, 8 pages.

European Patent Office, "Communication pursuant to Article 94(3) EPC," mailed in connection with European Patent Application No. 16924445.6, dated Sep. 7, 2020, 6 pages.

European Patent Office, "Communication under Rule 71(3) EPC", issued in connection with European Patent Application No. 16924445.6-1213, dated Feb. 19, 2021, (50 pages).

United States Patent and Trademark Office, "Non-Final Office Action", issued in connection with U.S. Appl. No. 16/326,878, dated Aug. 6, 2020, (4 pages).

United States Patent and Trademark Office, "Notice of Allowance", issued in connection with U.S. Appl. No. 16/326,878, dated Dec. 28, 2020, (9 pages).

European Patent Office, "Decision to Grant", issued in connection with European Patent Application No. 16924445.6-1213, dated May 14, 2021, (2 pages).

International Searching Authority, "International Preliminary Report on Patentability," issued in connection with International Application No. PCT/US2016/068382, dated Jun. 25, 2019, 6 pages.

The State Intellectual Property Office of People's Republic of China, "First Office Action and Search Report," issued in connection with Chinese Application No. 201680091025.4, dated Nov. 28, 2022, 10 pages. With English machine translation.

Gong et al., "An Efficient Management Method for Point Cloud Data Based on Octree and 3D R-tree," Acta Geodaetica et Cartographica Sinica, vol. 41, No. 4, Aug. 2012, 16 pages. With English machine translation.

The State Intellectual Property Office of People's Republic of China, "Notice on Grant," issued in connection with Chinese Application No. 201680091025.4, dated Sep. 11, 2023, 2 pages. With English translation.

* cited by examiner

METHODS, SYSTEMS AND APPARATUS TO IMPROVE SPATIAL-TEMPORAL DATA MANAGEMENT

RELATED APPLICATION

This patent arises from a continuation of U.S. patent application Ser. No. 16/326,878, (now U.S. Pat. No. 10,990,570) which was filed on Feb. 20, 2019, which arises from a national stage application of PCT Application No. PCT/US2016/068382, which was filed on Dec. 22, 2016. U.S. patent application Ser. No. 16/326,878 and PCT Application No. PCT/US2016/068382 are hereby incorporated herein by reference in their entireties. Priority to U.S. patent application Ser. No. 16/326,878 and PCT Application No. PCT/US2016/068382 is hereby claimed.

FIELD OF THE DISCLOSURE

This disclosure relates generally to network data management, and, more particularly, to methods, systems and apparatus to improve spatial-temporal data management.

BACKGROUND

In recent years, individual networked devices have been implemented to perform one or more utilitarian functions that, in the aggregate, permit objectives to be met. Example networked devices include temperature measurement devices, light incidence measurement devices, air quality measurement devices, etc. In some examples, relatively more complex networked devices are implemented, such as smart vehicles, drones, service robots, smart buildings, etc. Such devices may work together in an effort to facilitate one or more collaborative objectives based on acquired environmental information (e.g., measurement data points).

DETAILED DESCRIPTION

Figure 1:
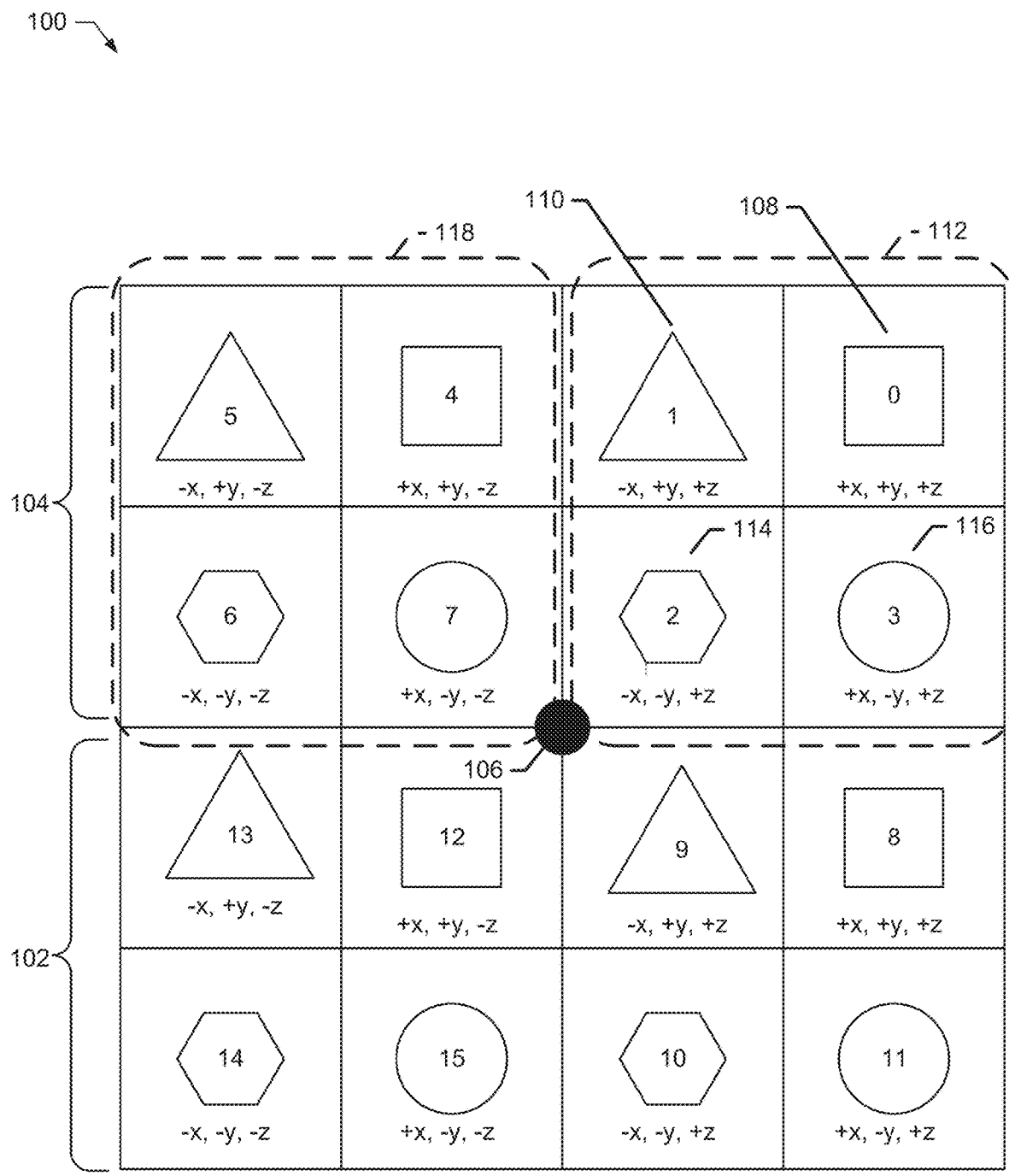
FIG. 1 is a schematic illustration of an example hyper-octree data structure constructed in accordance with the teachings of this disclosure to improve spatial-temporal data management.

Efforts to achieve cooperation with collaborative-interconnected devices typically requires one or more distributed heterogeneous systems to retrieve, manage, store and/or distribute data having spatial and temporal parameters. The collaborative-interconnected devices, sometimes referred to herein as "agents" or "clients," may independently perform data collection activities and/or environmental actions (e.g., drone flight path actions, robot movement actions, etc.). For example, one or more cameras and/or scanners placed within an area of interest (e.g., a warehouse) may analyze the area for object, debris and/or safe-path zones for the benefit of one or more agents (e.g., robots) operating in the area of interest (e.g., warehouse merchandising robots, sorting robots, material handling, etc.). The agents (e.g., robots) may utilize such collected camera/scanner information to determine whether a desired path of propagation is clear of obstacles at a particular time prior to traveling from a current location to a desired destination location.

Traditional techniques to manage spatio-temporal data distribution with disparate agents typically require relatively large amounts of memory reserved to represent each spatial dimension within the area of interest. As such, for portions of the area of interest that are static, valuable memory resources are consumed nonetheless. Moreover, because some collaborative objectives are temporally dynamic, additional layers of temporal data must be accounted for in the memory resources so that accurate dynamic representations of movement (e.g., new obstacles entering a previously cleared pathway) can be identified. Thus, the traditional distributed storage and management systems may become inundated with memory management tasks for redundant spatial data points for different time-periods of interest, even when no spatial variation in those spatial data points occurs.

Traditional techniques to manage data distribution with disparate agents also lack an ability to efficiently manage different resolutions that may be provided by one or more agents in an area of interest. For example, camera agents may collect spatiotemporal data (e.g., four-dimensional (4D) data made up of three dimensional (3D) axis spatial data and corresponding temporal data (3D spatial+1D temporal)) from a warehouse wall to identify path obstructions or changes that might impede the ability of warehouse robot propagation down a hallway. The collected image data may be stored with a resolution in meters. However, a separate agent (e.g., a camera agent on the propagating robot itself) may include a sensor with a more granular resolution to facilitate movement, analysis and/or control of the robot in a relatively more granular scale, such as centimeters (e.g., a robot arm instructed to place an item on a shelf). Unlike traditional distributed storage systems, examples disclosed herein facilitate a multi-resolution data management system to accommodate the different granularity requirements of different agents working together for a collaborative objective.

Examples disclosed herein improve spatial-temporal data management activities to semantically, geometrically and temporally stitch together interconnected network agents with a unified space-time container (data structure). Examples disclosed herein improve storage efficiency, adapt to dynamic data changes, and facilitate solutions for future changes to the data structure as the collaborative objective changes. Examples disclosed herein facilitate a common coordinate system in space and time to facilitate participation by one or more agents that lack a common data granularity.

FIG. 1 illustrates an example hyper-octree data structure 100 to store spatiotemporal data. In the illustrated example of FIG. 1, the hyper-octree data structure 100 includes sixteen (16) hypervoxels shown numbered from zero (0) to fifteen (15). In some examples, the hyper-octree data structure 100 is referred to herein as a "hexatree" and employed in a cloud environment and, accordingly, referred to herein as a "hexacloud." Generally speaking, cloud computing refers to a coordinated network of computing devices. As used herein, "octree" refers to the resulting subspace after removing (fixing constant) one dimension and combining the hypervoxels that have the same indices on remaining dimensions. As used herein, a "quadtree" refers to the resulting subspace after removing (fixing constant) one dimension of an octree and combining the voxels that have the same indices on the remaining dimensions. In particular, a quadtree is a two-dimensional representation, while an octree is a three-dimensional representation, and a hexatree is a four-dimensional representation. The example hyper-octree data structure 100 includes a negative time octree 102 (e.g., a first octree after fixing the time dimension to t−1) and a positive time octree 104 (e.g., a second octree after fixing the time dimension to t) based on a relative temporal relationship to a hyperspace center point 106. The example hyperspace center point 106 reflects a four-dimensional reference point in terms of space (e.g., three dimensions) and time (e.g., one dimension). The example positive time octree 104 represents temporal detail that occurs after the relative time associated with the example hyperspace center point 106 (e.g., "future" time), and the example negative time octree 106 represents temporal detail that occurs prior to the relative time associated with the example hyperspace center point 106 (e.g., "past" time). In some examples, the hyperspace center point 106 is a spatiotemporal reference point, such as an example application of the center of a supermarket having an x-axis, y-axis and z-axis spatial reference value (e.g., 0,0,0 distance units (e.g., kilometers, meters, centimeters, millimeters, etc.), and a temporal reference value (e.g., 0 hours, minutes, seconds, milliseconds, etc.).

In the illustrated example of FIG. 1, each hypervoxel (e.g., see numerical identifiers zero (0) through fifteen (15)) represents one of sixteen indexes that define a spatiotemporal representation in view of (relative to) the example hyperspace center point 106. An example first hypervoxel 108 (see index zero (0) surrounded by a square shape) represents spatiotemporal information occurring after the hyperspace center point 106 due to its proximity in the positive time octree 104, and represents an x-axis subspace, y-axis subspace and z-axis subspace having values greater than the hyperspace center point 106. In another example, a second hypervoxel 110 (see index one (1) surrounded by a triangle shape) represents spatiotemporal information occurring in future time, and represents a y-axis and z-axis positive subspace, but an x-axis negative subspace (e.g., x-axis spatial value lower than that of the hyperspace center point 106).

Each hypervoxel (sometimes referred to as a "hypernode") describes a spatiotemporal partition subspace, which may include a leaf node (e.g., a lowest level of detail/resolution) and one or more intermediary resolution nodes (internal nodes). As such, each hypervoxel stores content of a bounded cube in space within a delimited time interval, in which each hypervoxel exposes one or more properties to determine if it is a leaf node, an internal node with content, an internal node without content, or the root. As such, the example hyper-octree data structure 100 facilitates a non-uniform resolution to improve scalability and flexibility beyond traditional distributed data techniques. Additionally, because the example hyper-octree data structure 100 is a data structure representation of index values that map real-world spatial areas, such representations of the spatial areas do not consume platform physical memory/storage for empty space within such spatial areas of interest. In this manner, an amount of memory and/or computational power used to manage spatiotemporal data can grow and adapt to different applications and nuances they may contain. The content of the example hypernodes is flexible, and can include spatiotemporal values and metadata, unlike the inherent structural attributes statically associated with conventional distributed data systems. As described in further detail below, extensible metadata may be combined with the example hypervoxels to accommodate improved scalability and flexibility with coordinated agents. In other words, example hypervoxels contain metadata representations (e.g., pointers, uniform resource locators (URLs), uniform resource identifiers (URIs), etc.).

Returning to the illustrated example of FIG. 1, the hyper-octree data structure 100 establishes symmetry to improve computational efficiency for relatively fast bit-wise operation. As described above, temporal symmetry is established with the example positive time octree 104 and the example negative time octree 102. Additionally, each octree can be sub-divided into two quadtrees that divide the resulting space in two parts along one of the remaining dimensions to represent spatial symmetry. Generally speaking, symmetry occurs on any dimension, and the space can be partitioned using any of the available four (4) dimensions. The hyper-octree data structure 100 can be divided into two octrees by fixing the value of any of the dimensions and dividing again using one of the remaining ones to obtain a quadtree, and this may be repeated to obtain a binary tree, and yet again to obtain a hypervoxel indexed by the four values used to reach/reference it. In particular, the example hyper-octree data structure 100 of FIG. 1 includes a first quadtree 112, which includes the hypervoxel element zero (0) 108, the example hypervoxel element one (1) 110, an example hypervoxel element two (2) 114, and an example hypervoxel element three (3) 116. The example first quadtree 112 reflects symmetry of the x-axis and y-axis subspaces (both negative and positive). The z-axis subspace associated with the example first quadtree 112 reflects the z-axis positive subspace, and its symmetric counterpart is represented in an example second quadtree 118 to reflect the z-axis negative subspace.

Examples disclosed herein build one or more hyper-octree data structures, such as the example hyper-octree data structure 100 of FIG. 1, and manage input requests from any number of agents. As described in further detail below, new spatiotemporal data points to be added are analyzed to determine operational resolution and boundary conditions to allow non-uniform resolution management. Additionally, examples disclosed herein analyze input requests to determine whether a data point to be inserted is outside a current hyper-octree octree so that one or more additional roots are to be generated/expanded (recursively), thereby representing real world spatial and temporal targets that might reside beyond a currently established root, as described in further detail below.

Figure 2:
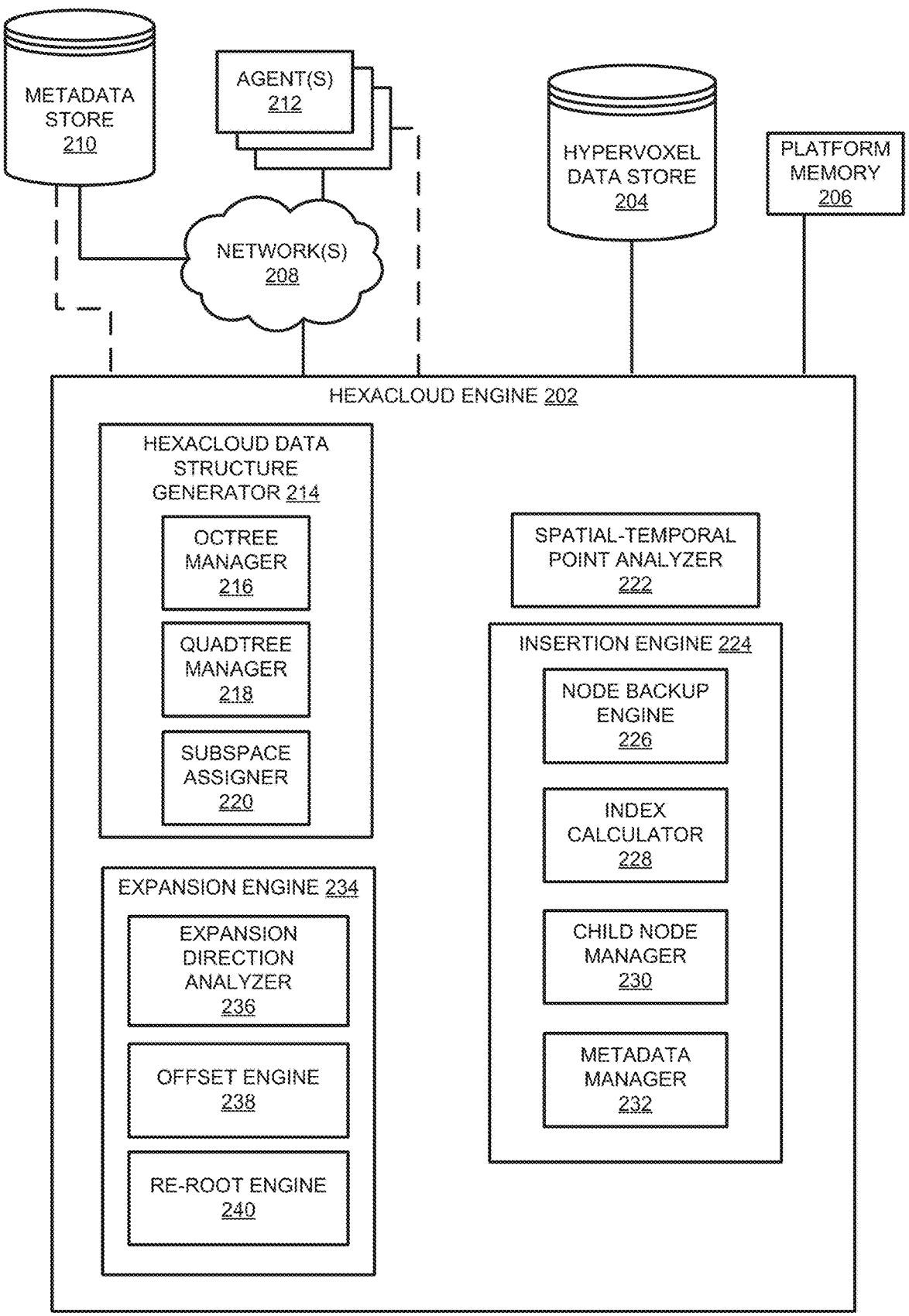
FIG. 2 is an example hexacloud system constructed in accordance with the teachings of this disclosure to improve spatial-temporal data management.

FIG. 2 is an example hexacloud system 200 to improve spatial-temporal data management. In the illustrated example of FIG. 2, the hexacloud system 200 includes a hexacloud engine 202 communicatively connected to a hypervoxel data store 204, a platform memory 206, and one or more networks 208. The example hexacloud engine 202 is also communicatively connected to an example metadata store 210 and any number of agents 212 either directly and/or via the example networks 208. The example hexacloud engine 202 of FIG. 2 also includes an example hypervoxel data structure generator 214, which includes an example octree manager 216, an example quadtree manager 218, and an example subspace assigner 220. The example hexacloud engine 202 of FIG. 2 also includes an example spatial-temporal point analyzer 222, and an example insertion engine 224, which includes an example node backup engine 226, an example index calculator 228, an example child node manager 230, and an example metadata manager 232. The example hexacloud engine 202 of FIG. 2 also includes an example expansion engine 234, which includes an example expansion direction analyzer 236, an example offset engine 238, and an example re-root engine 240.

In operation, the example hypervoxel data structure generator 214 generates a root hypervoxel data structure having sixteen (16) hypernodes. The example octree manager 216 improves a spatiotemporal data access efficiency by generating a first degree of symmetry that separates the hypernodes into two separate groups of eight (8) hypernodes to create a positive octree and a negative octree. As described above, the example positive octree (e.g., the example positive time octree 104 of FIG. 1) and the example negative octree (e.g., the example negative time octree 102 of FIG. 1) represent relative positive and negative time offsets from a hyperspace center point, such as the example hyperspace center point 106 of FIG. 1.

The example octree manager 216 selects one of the octrees, and the example quadtree manager 218 further improves the spatiotemporal data access efficiency by generating a second degree of symmetry. In particular, the example quadtree manager 218 selects a quadtree from one of the octrees previously established. As described above, and in connection with the illustrated example of FIG. 1, each quadtree of a given octree represents one of either negative z-axis subspace or positive z-axis subspace. The example quadtree manager 218 designates and/or otherwise assigns one of the quadtrees as each type of positive or negative z-axis subspace, and the example subspace assigner 220 assigns hypernodes within each quadtree of interest with subspace types. In particular, the example subspace assigner 220 improves computational efficiency when accessing example hyper-octree data structures to enable bit-wise computation by assigning symmetric subspace types. Returning to the illustrated example of FIG. 1, the example subspace assigner 220 assigns node zero (0) and node three (3) with positive x-axis subspace, and symmetrically assigns node one (1) and node two (2) with negative x-axis subspace. Additionally, the example subspace assigner 220 assigns node zero (0) and node one (1) with positive y-axis subspace, and symmetrically assigns node two (2) and node three (3) with negative y-axis subspace.

After the example subspace assigner 220 assigns nodes with symmetric subspace representations for one quadtree of interest, the example hypervoxel data structure generator 214 selects another available quadtree of interest (e.g., a previously unassigned quadtree), for which subspace assignments are generated. Additionally, upon completion of all quadtrees within an octree of interest, the example data structure generator 214 selects another available octree of interest, for which the subspace assignment repeats for all previously unassigned hypervoxels.

During access operations of the example hyper-octree data structure 100 generated by the example hypervoxel data structure generator 214, the example spatial-temporal point analyzer (STPA) 222 determines whether one or more agents attempt to add spatiotemporal data to the example hyper-octree data structure 100. If so, it extracts and/or otherwise evaluates spatial value information related to x-axis, y-axis and z-axis spatial information. Additionally, the example STPA 222 extracts and/or otherwise evaluates time-based information, spatial resolution information ($\delta$) and temporal resolution information ($\tau$). In some examples, the STPA 222 evaluates the spatial resolution information and/or the temporal resolution information received from an agent (e.g., a robot, a sensor, a camera, a quadcopter, etc.) to determine a corresponding resolution type. Resolution types may include particular ranges of values in terms of, for example, millimeters (as compared to a relatively coarser centimeter resolution), centimeters (as compared to a relatively coarser meter resolution), etc. Although at least one hyper-octree data structure 100 has been created, as described above, it has a finite spatial and temporal boundary. For example, the hyperspace center point 106 may initially identify x, y and z coordinates of zero meters and a time of 12:00 on a specified date of interest. The spatial reach of the example hyper-octree data structure 100 may represent a maximum distance of spatial dimensions+/−1 meter from the hyperspace center point 106, thereby representing a spatial cube of 2-meters in each axis. Similarly, the temporal boundary may have a finite limit of +/−one hour. An initial or current hyper-octree data structure is sometimes referred to herein as a root node and/or otherwise the current node.

As such, in the event an input data point is within the spatial-temporal boundary of the root node, then the example hexacloud engine 202 enters data associated with the input data into the appropriate index (e.g., hypervoxel) of the example hyper-octree data structure at a resolution of interest. On the other hand, in the event the example spatial-temporal point analyzer 222 determines that an input point (P) is not within the spatial-temporal boundary of the current/root node, then the expansion engine 234 creates and/or otherwise generates one or more hyper-octree data structure(s) to accommodate the new input point data. For instance, and continuing with the example root structure 100 having a 2×2×2 meter dimension, if the new input data point includes an x-axis spatial value of +3 meters, then the example expansion engine 234 generates an expanded hyper-octree data structure having spatial and temporal boundaries to accommodate a relatively larger space. Stated differently, the example expansion engine 234 generates another hyper-octree data structure that grows symmetrically, such that a new root is created with a double size on each dimension, and the corresponding node of the newly created 16-nodes is assigned to the original hyper-octree.

In response to the example spatial-temporal point analyzer 222 determining and/or otherwise calculating that a new input point (P) has spatiotemporal dimensions that are consistent, within, and/or otherwise align with the current/root node (e.g., a first hyper-octree data structure, such as the example hyper-octree data structure 100 of FIG. 1), the example hexacloud engine 202 determines whether the contents of P and/or its associated metadata are different from values that may already be stored in the example hyper-octree data structure 100. If not, then the example hexacloud engine 202 conserves memory and/or computational resources by preventing and/or otherwise refraining from storing new input point (P). Conventional storage techniques, on the other hand, typically engage in write operations regardless of whether new input data has the same values as data already stored therein.

Prior to adding input data associated with input point (P), the example node backup engine 226 assigns the current tree root node to an auxiliary node with a working variable (e.g., auxiliary node N). In particular, the example node backup engine 226 generates the auxiliary node as a precaution to prevent data loss during one or more operations, measurements and/or recursive calculations that might otherwise corrupt the current node. The example STPA 222 determines if the resolution of point P is compatible with the root node (now backup/auxiliary node N), or whether point P is a leaf node. As used herein, a root node is a node that has no parent and contains the entirety of a spatiotemporal representation of nodes beneath it for a given region. As used herein, a leaf node is a node that has no children and contains data at the lowest level (e.g., lowest resolution capability of the hyper-octree data structure). As used herein, internal nodes are intermediate nodes between the extremes of leaf nodes and root nodes. In some examples, the example STPA 222 performs a resolution test in a manner consistent with example Equation 1.

$$N \cdot \delta < P \cdot \delta \text{ or } N \cdot \tau < P \cdot \tau$$

In the illustrated example of Equation 1, N refers to the backup copy of the current (root) node, δ refers to a spatial resolution value (e.g., in millimeters, in centimeters, in meters, in kilometers, etc.), in which the notation N, reflects the spatial resolution property of node "N," and P·δ reflects the spatial resolution property of new point P. Additionally, r refers to a temporal resolution value (e.g., in microseconds, in milliseconds, in seconds, in minutes, etc.), in which the notation "N·τ" reflects the temporal resolution property of node "N," and the notation "P·τ" reflects the temporal resolution property of new point P.

Generally speaking, the illustrated example of Equation 1 tests and/or otherwise determines whether the insertion point P resides within the range of the root node where data is to be inserted. In other words, is the portion of the root node being pointed to matching a resolution of the point P to be added/inserted? For example, the current root node may be set to a spatial resolution of millimeters, while the new point P may have a spatial resolution of centimeters. In such a circumstance, the test of example Equation 1 fails and the example index calculator 228 resolves a resolution for node N. In particular, the example index calculator 228 generates a child index value "k" and determines which indexed hypervoxel the new point P is to be associated with (e.g., see hypervoxel index values zero (0) through fifteen (15) in the illustrated example of FIG. 1). The example index calculator 228 evaluates new point P to determine whether it is associated with past or future time (e.g., relative to the example hyperspace center point 106), thereby identifying whether new point P is to be associated with a first or second octree of the example hyper-octree data structure 100. The example index calculator 228 also determines whether a z-axis value, a y-axis value and an x-axis value of new point P is either negative or positive with respect to the example hyperspace center point 106, thereby identifying which quadtrees and, ultimately, which hypervoxel the new point P is to be associated. Child index "k" is thereafter associated with the appropriate index value associated with the corresponding hypervoxel.

The example child node manager 230 determines whether the identified hypervoxel has a child at index "k." In the event a child node is available, then the example child node manager 230 sets the node N (working value for the root node) to the child at index k. On the other hand, if the example child node manager 230 determines that no child node exists, then any data entry attempt would encounter empty space, and the child node manager 230 creates a child node. However, before beginning any write-attempt at the particular indexed hypervoxel at the current resolution, the example STPA 222 re-evaluates point P in connection with the adjusted resolution. In the event one or more additional resolution "steps" are required, then the index calculator 228 repeats the analysis to identify the correct/corresponding hypernode at the modified resolution (e.g., going from millimeters to kilometers may require intermediate resolution shifts (a) from millimeters to centimeters, (b) from centimeters to meters and (c) from meters to kilometers).

In some examples, the STPA 222 determines that either (a) the resolution of point P is compatible with the root node N or (b) a leaf node is encountered. If so, then the example metadata manager 232 is invoked to perform hypervoxel metadata insertion. In particular, the example metadata manager 232 retrieves the index location previously calculated and determines whether the metadata (Q) associated with point P is to be stored locally or remotely. In the event it is to be stored locally, then the metadata manager 232 inserts the data into a local storage of the agent making the write request, but if the metadata Q can (optionally) be stored in one or more external locations (e.g., an external database, a networked cloud storage, etc.), then an identifier is resolved with the external data source via one or more queries. In some examples, when metadata can be stored externally, such external storage is not mandatory and internal storage may still occur, as desired. In some examples, the identifier of the metadata, or the metadata itself is the identifier, such as a URI/URL. The example metadata manager 232 uses the identifier to obtain a proxy that can be used for metadata retrieval in the future, and the retrieved proxy may be used to apply an insertion/update of the metadata during the write operation of point P. Because in some examples, the intermediate nodes may store a degree of data, the example insertion engine 224 verifies whether the current node is a leaf node and, if not the index calculator 228 continues one or more recursive operations to reach the root node for data insertion.

As discussed above, in some examples the new point P to be added to the example hyper-octree data structure 100 is outside the spatiotemporal boundaries of that data structure. In such circumstances, the example expansion engine 234 creates one or more additional hyper-octree data structures, as needed. In particular, the example expansion direction analyzer 236 initially determines an appropriate expansion direction based on the new input point (P). For example, if the current root node is a bounded hypervoxel having an origin of x=0, y=0 and z=0 and can represent spatial distances that are plus or minus one meter in length (e.g., total cube spatial range in each axis is 2 meters), and new point P includes an x-axis dimension of 3 meters, then the example expansion engine 234 identifies that the new hypervoxel expansion should occur. Additionally, the example offset engine 238 calculates space and time offset values for the new point (P) in the new (expanded) node after it is created.

However, in addition to identifying the correct index location within the new (expanded) node in which the new point (P) is to reside, the example offset engine 238 also calculates a new node origin point for the expanded node and corresponding dimensions of the expanded node. In some examples, the offset engine 238 creates the new expanded root node in a manner consistent with example Equations 2, 3, 4 and 5.

$$R' \cdot \delta \cdot x = R \cdot \delta \cdot x * 2 \qquad \text{Equation 2.}$$

$$R' \cdot \delta \cdot y = R \cdot \delta \cdot y * 2 \qquad \text{Equation 3.}$$

$$R' \cdot \delta \cdot z = R \cdot \delta \cdot z * 2 \qquad \text{Equation 4.}$$

$$R' \cdot \tau = R \cdot \tau * 2 \qquad \text{Equation 5.}$$

In the illustrated examples of Equations 2, 3, 4 and 5, R' (R-prime) reflects the new (expanded) node in the desired spatial resolution of interest (δ) for a subspace of interest (e.g., x-axis, y-axis or z-axis). The desired temporal resolution of interest is represented by (τ). Additionally, example Equations 2, 3, 4 and 5 illustrate that the spatiotemporal parameters for the expanded node include the previous node spatiotemporal parameters multiplied by two (2).

The new expanded node is to become the new current node and defined as a "parent" to the former "current" node, and the new expanded node includes a corresponding hyperspace center point (similar to the example hyperspace center point 106 of FIG. 1). In some examples, the offset engine 238 invokes example code 300 to calculate space-time delta values in a manner consistent with FIG. 3.

Figure 3:
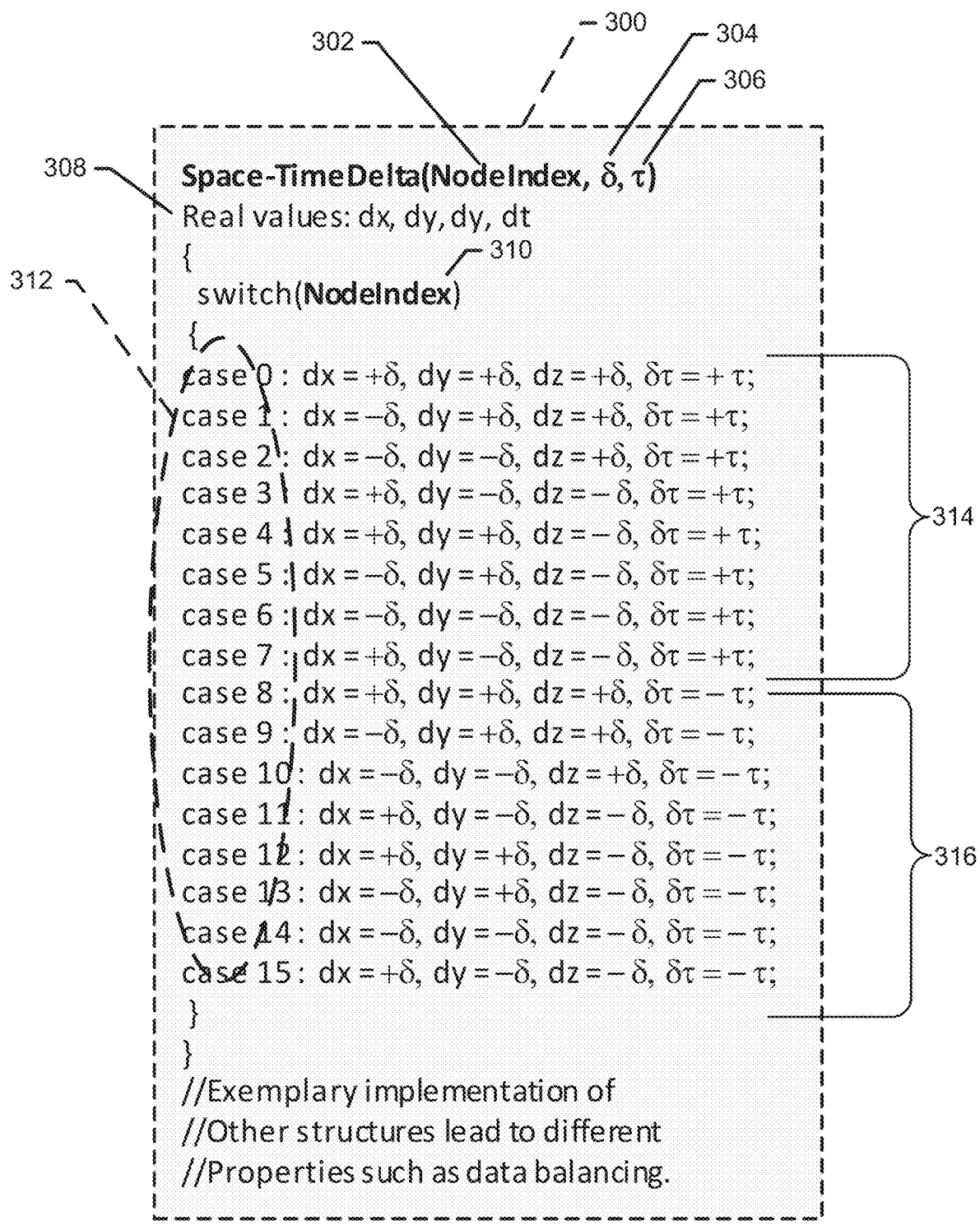
FIG. 3 is example code to calculate space-time delta values executed by the example processor of FIG. 10.

In the illustrated example of FIG. 3, space-time delta code 300 takes as inputs a node index value 302 previously calculated (e.g., resulting in one of sixteen index values (0 through 15) that identifies a corresponding hypervoxel), a spatial resolution value 304, and a temporal resolution value 306. The example space-time delta code 300 also includes spatial and temporal real values 308 associated with the new point P that triggered the expansion requirement. Based on the index value input 302, the example space-time delta code 300 applies a switch function 310 to identify one of sixteen case values 312 with which to calculate delta/difference values. As can be seen from the illustrated example of FIG. 3, the space-time delta code 300 reflects a degree of symmetry, in which the first eight case values 314 represent positive time associated with a first octree, and the second eight case values 316 represent negative time associated with a second octree.

The example offset engine 240 establishes and/or otherwise sets a space-time center of the new expanded node in a manner consistent with example Equations 6, 7, 8 and 9.

$$R'\cdot cx = R \cdot xc + dx \quad \text{Equation 6.}$$

$$R'\cdot cy = R \cdot yc + dy \quad \text{Equation 7.}$$

$$R'\cdot cz = R \cdot zc + dz \quad \text{Equation 8.}$$

$$R'\cdot ct = R \cdot tc + tz \quad \text{Equation 9.}$$

In the illustrated examples of Equations 6, 7, 8 and 9. R' (R-prime) reflects the new (expanded) node, R reflects the current node, xc, yc, zc and tc reflect spatial and temporal center points, respectively, and values for dx, dv, dz and tz are derived in a manner consistent with FIG. 3.

Now that a new expansion hyper-octree data structure has been generated having a corresponding hyperspace center point and an identified target hypervoxel with which to associate the new input data P, the example re-root engine 240 re-roots the current root node (e.g., the original root node "R" 100) by assigning it as a child to the new expanded hyper-octree data structure "R'" (R-prime). Accordingly, further reference to a hyper-octree data structure will correspond to the newly expanded tree root R' as the parent, while the one or more previously (e.g., originally) generated hyper-octree data structures (e.g., the example hyper-octree data structure 100 of FIG. 1) are deemed child nodes.

While an example manner of implementing the hexacloud system 200 of FIG. 2 is illustrated in FIGS. 1 through 3, one or more of the elements, processes and/or devices illustrated in FIGS. 1-3 may be combined, divided, re-arranged, omitted, eliminated and/or implemented in any other way. Further, the example hypervoxel data structure generator 214, the example octree manager 216, the example quadtree manager 218, the example subspace assigner 220, the example spatial-temporal point analyzer 222, the example insertion engine 224, the example node backup engine 226, the example index calculator 228, the example child node manager 230, the example metadata manager 232, the example expansion engine 234, the example expansion direction analyzer 236, the example offset engine 238, the example re-root engine 240, the example metadata store 210, the example hypervoxel data store 204, the example platform memory 206 and/or, more generally, the example hexacloud engine 202 of FIG. 2 may be implemented by hardware, software, firmware and/or any combination of hardware, software and/or firmware. Thus, for example, any of the example hypervoxel data structure generator 214, the example octree manager 216, the example quadtree manager 218, the example subspace assigner 220, the example spatial-temporal point analyzer 222, the example insertion engine 224, the example node backup engine 226, the example index calculator 228, the example child node manager 230, the example metadata manager 232, the example expansion engine 234, the example expansion direction analyzer 236, the example offset engine 238, the example re-root engine 240, the example metadata store 210, the example hypervoxel data store 204, the example platform memory 206 and/or, more generally, the example hexacloud engine 202 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hypervoxel data structure generator 214, the example octree manager 216, the example quadtree manager 218, the example subspace assigner 220, the example spatial-temporal point analyzer 222, the example insertion engine 224, the example node backup engine 226, the example index calculator 228, the example child node manager 230, the example metadata manager 232, the example expansion engine 234, the example expansion direction analyzer 236, the example offset engine 238, the example re-root engine 240, the example metadata store 210, the example hypervoxel data store 204, the example platform memory 206 and/or, more generally, the example hexacloud engine 202 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example hexacloud system 200 of FIG. 2 may include one or more elements, processes and/or devices in addition to, or instead of, those illustrated in FIGS. 1-3, and/or may include more than one of any or all of the illustrated elements, processes and devices.

Flowcharts representative of example machine readable instructions for implementing the hexacloud system 200 of FIGS. 1-3 are shown in FIGS. 4-9. In these examples, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 4-9, many other methods of implementing the example hexacloud system 200 may alternatively be used. For example, the order of execution of the blocks may be changed, and/or some of the blocks described may be changed, eliminated, or combined.

As mentioned above, the example processes of FIGS. 4-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
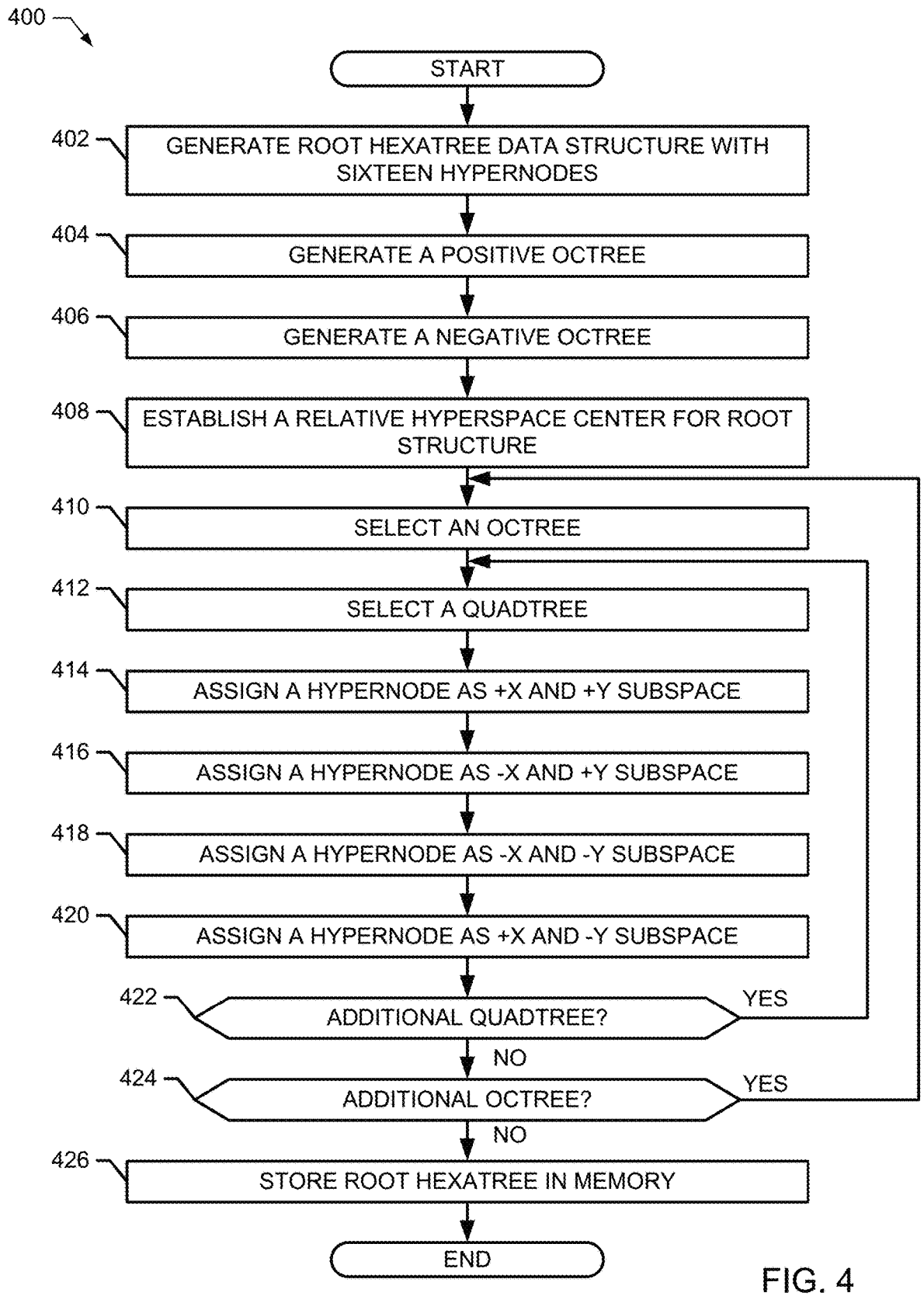
FIGS. 4-9 are flowcharts representative of example machine readable instructions that may be executed to implement the example hexacloud system of FIG. 2.

The program 400 of FIG. 4 begins at block 402, where the example hypervoxel data structure generator 214 generates a root hypervoxel data structure having sixteen hypernodes. As described above, these sixteen hypernodes are generated having a symmetric orientation to improve computational efficiency when performing bit-wise operations on the example hypervoxel data structure (e.g., such as the example hypervoxel data structure 100 of FIG. 1) during access operation(s). In particular, the example hypervoxel data structure generator 214 generates and/or otherwise assigns a positive octree with a first group of eight hypernodes (block 404) to represent temporal data that is positive (e.g., "future time") with respect to a hyperspace center point. Additionally, the example hypervoxel data structure generator 214 generates and/or otherwise assigns a negative octree with a second (remaining) group of eight hypernodes (block 406) to represent temporal data that is negative (e.g., "past time") with respect to the hyperspace center point. The example hypervoxel data structure generator 214 establishes the hyperspace center point (e.g., the example hyperspace center point 106 of FIG. 1) at the intersection of the positive time octree (e.g., the example positive time octree 104 of FIG. 1) and the negative time octree (e.g., the example negative time octree 102 of FIG. 1) (block 408).

The example program 400 of FIG. 4 further configures the example hyper-octree data structure on an octree-by-octree, quadtree-by-quadtree and hypervoxel-by-hypervoxel hierarchical manner. In particular, the example octree manager 216 selects a previously unexamined/unconfigured octree subset of hypernodes/hypervoxels from the 4D cuboid volume (block 410) and the example quadtree manager 218 selects a previously unexamined/unconfigured quadtree subset of hypernodes/hypervoxels from the selected octree to be assigned one of positive z-axis subspace or negative z-axis subspace (block 412). As described above in connection with FIG. 1, the example first quadtree 112 is assigned to represent the positive z-axis subspace during a first iteration of the example program 400.

In view of the selected quadtree of interest, the example subspace assigner 220 assigns a hypernode/hypervoxel of the quadtree to represent positive x-axis and positive y-axis subspace (block 414). In the illustrated example of FIG. 1, this is shown as hypervoxel element zero (0) 108. The example subspace assigner 220 assigns a separate hypernode/hypervoxel of the selected quadtree to represent negative x-axis and positive y-axis subspace (block 416), which is shown in the illustrated example of FIG. 1 as hypervoxel element one (1) 110. The example subspace assigner 220 assigns a remaining separate hypernode/hypervoxel of the selected quadtree to represent negative x-axis and negative y-axis subspace (block 418), which is shown in the illustrated example of FIG. 1 as hypervoxel element two (2) 114. Finally, the example subspace assigner 220 assigns the remaining hypernode/hypervoxel of the selected quadtree to represent positive x-axis and negative y-axis subspace (block 420), which is shown in the illustrated example of FIG. 1 as hypervoxel element three (3) 116.

The example hypervoxel data structure generator 214 determines whether an additional quadtree of the selected octree has yet to be configured (block 422) and, if so, control returns to block 412. If not, the example hypervoxel data structure generator 214 determines whether an additional octree has yet to be configured (block 424) and, if so, control returns to block 410. If not, then the hyper-octree data structure generation is complete and the example hypervoxel data structure generator 214 stores the root 4D cuboid volume in the example hypervoxel data store 204 (block 426). As described above, while the example generated hexatree (e.g., the example hexatree 100 of FIG. 1) is a data structure to represent spatiotemporal information of a real-world area of interest, the data structure itself does not pre-allocate explicit portions of the example platform memory 206, thereby conserving valuable memory resources that would otherwise be consumed by empty space by conventional distributed database systems.

Figure 5:
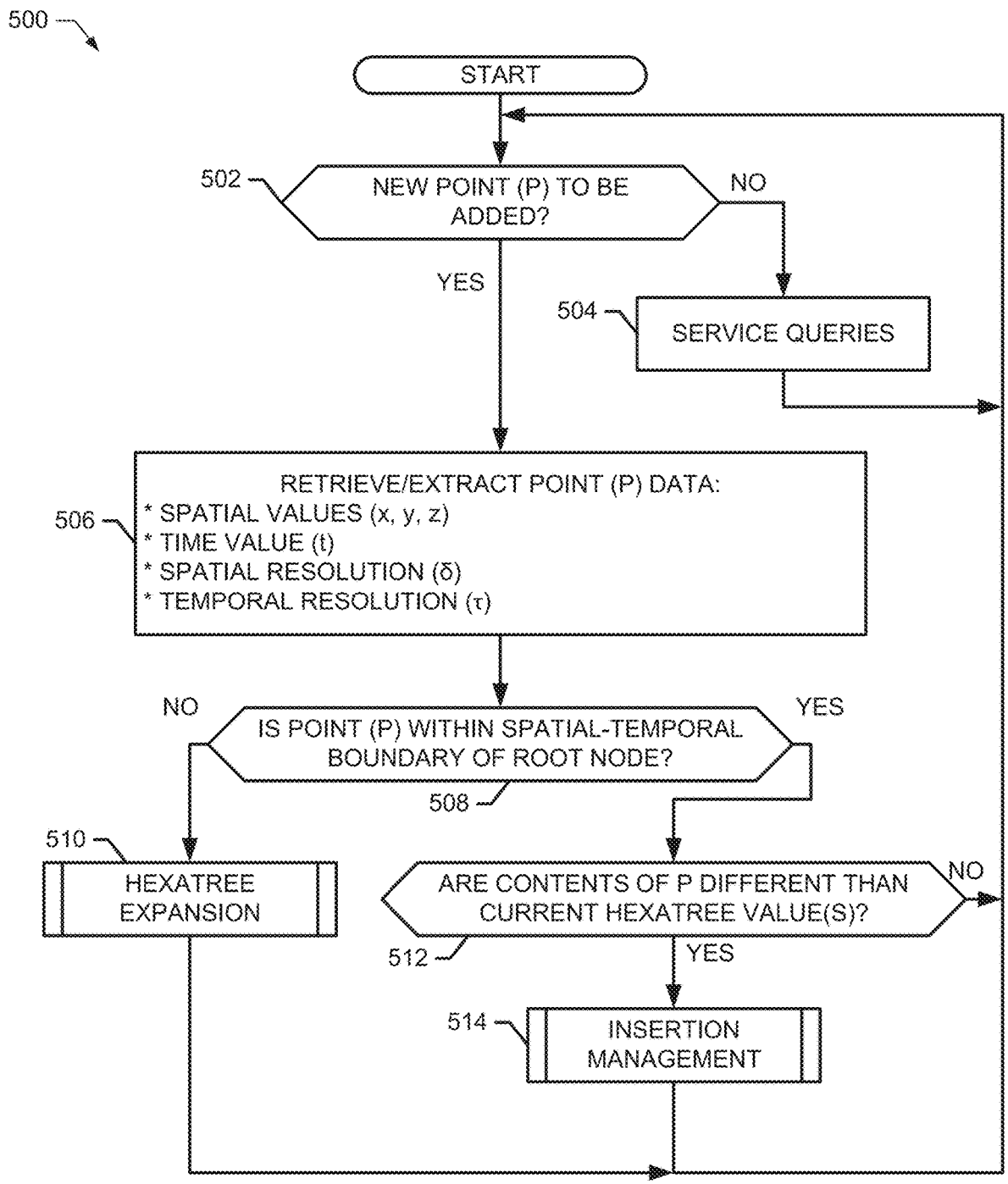

FIG. 5 is an example program 500 to manage hypervoxel access (reads/writes) of the example hexatree. In the illustrated example of FIG. 5, the spatial-temporal point analyzer (STPA) 222 determines whether a new input point (P) is to be added to the hexatree (block 502). If not, the example hexacloud engine 202 services one or more queries of data contained therein (block 504). Otherwise, in response to detecting an input access request (block 502), the example STPA 222 retrieves and extracts information associated with the new or modified input point (P) (block 506). Extracted information includes, but is not limited to, spatial values (e.g., x-axis, y-axis, z-axis spatial information), temporal values (e.g., capture time of the spatial values), spatial resolution information and/or temporal resolution information.

Because a current hyper-octree data structure (root) has a finite logical spatial and temporal boundary, the example STPA 222 determines whether the input point P information is within such boundaries of the current root node (block 508). If not, the example expansion engine 234 is invoked to expand and/or otherwise build-out a new hexatree to accommodate the new input point P (block 510), as described above and in further detail below. On the other hand, in the event the new input point P is within the spatiotemporal boundary of the current (root) node (block 508), then the example hexacloud engine 202 determines whether the contents of input point P are different than the information already stored in the current node (block 512). If not, then further storage attempts are deemed wasteful, and processing and/or storage conservation is improved by ignoring the input request and control returns to block 502. On the other hand, in the event the input point P information is different (block 512), then the example insertion engine 224 manages the insertion process (block 514), as described above and in further detail below.

Figure 6:
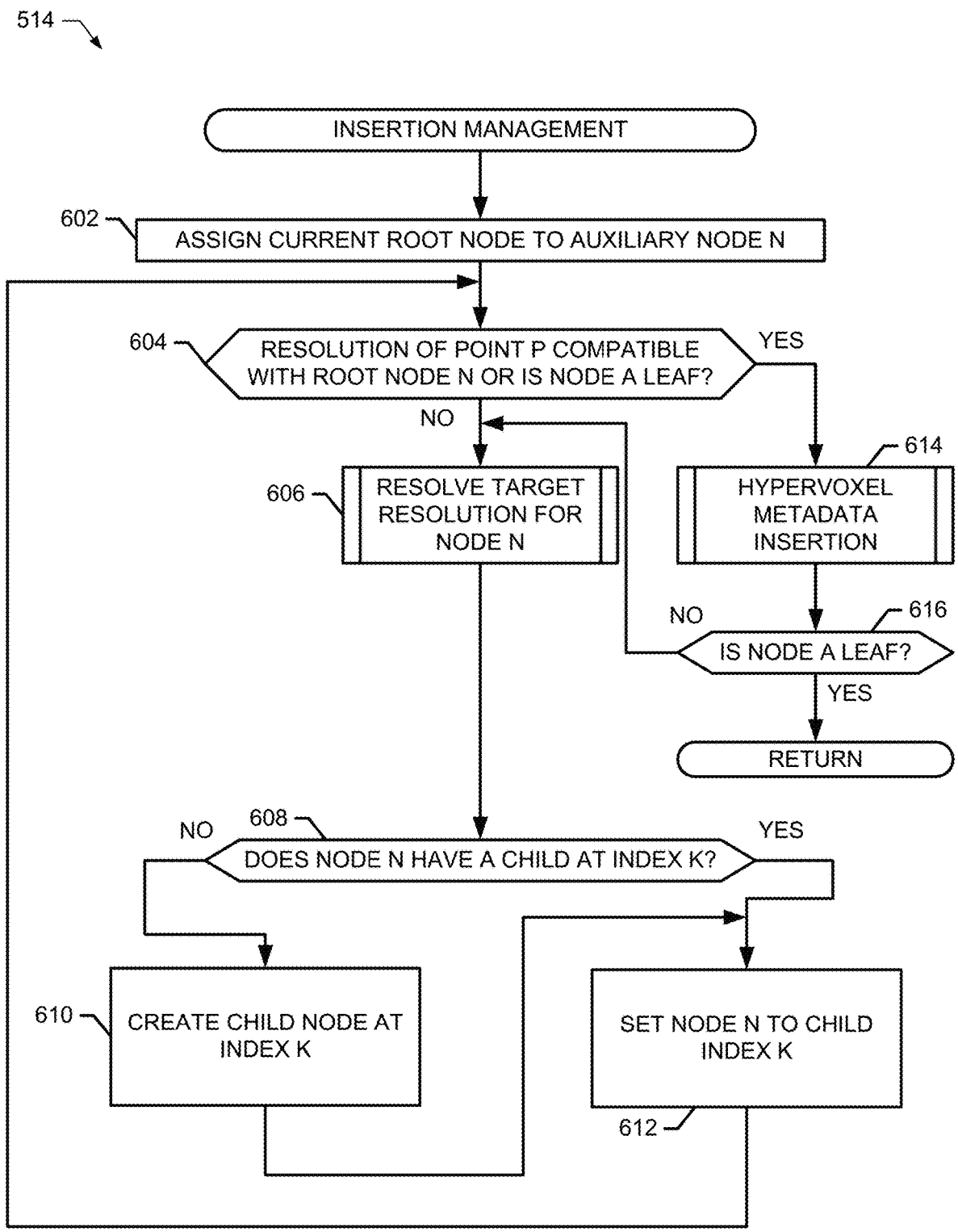

FIG. 6 illustrates additional detail in connection with insertion management (block 514) of FIG. 5. In the illustrated example of FIG. 6, the example node backup engine 226 assigns the current tree root node (R) to an auxiliary node variable N as a precaution to prevent potential corruption of the root node until after the appropriate insertion index point(s) can be determined (block 602). The example STPA 222 determines whether the input point P resolution information (e.g., spatial resolution S, temporal resolution r) are consistent with the current root node (N), or whether the node is associated with a leaf node (block 604). As described above, examples disclosed herein facilitate a multi-resolution or non-uniform tree management system in which one or more agents (e.g., quad-copters, robots, sensors, etc.) do not have to comply with rigid resolution constraints typically associated with traditional systems. Examples disclosed herein resolve resolution disparity between an input point P and a current node focus so that multi-resolution spatiotemporal management can be processed in an efficient bit-wise manner.

Figure 7:
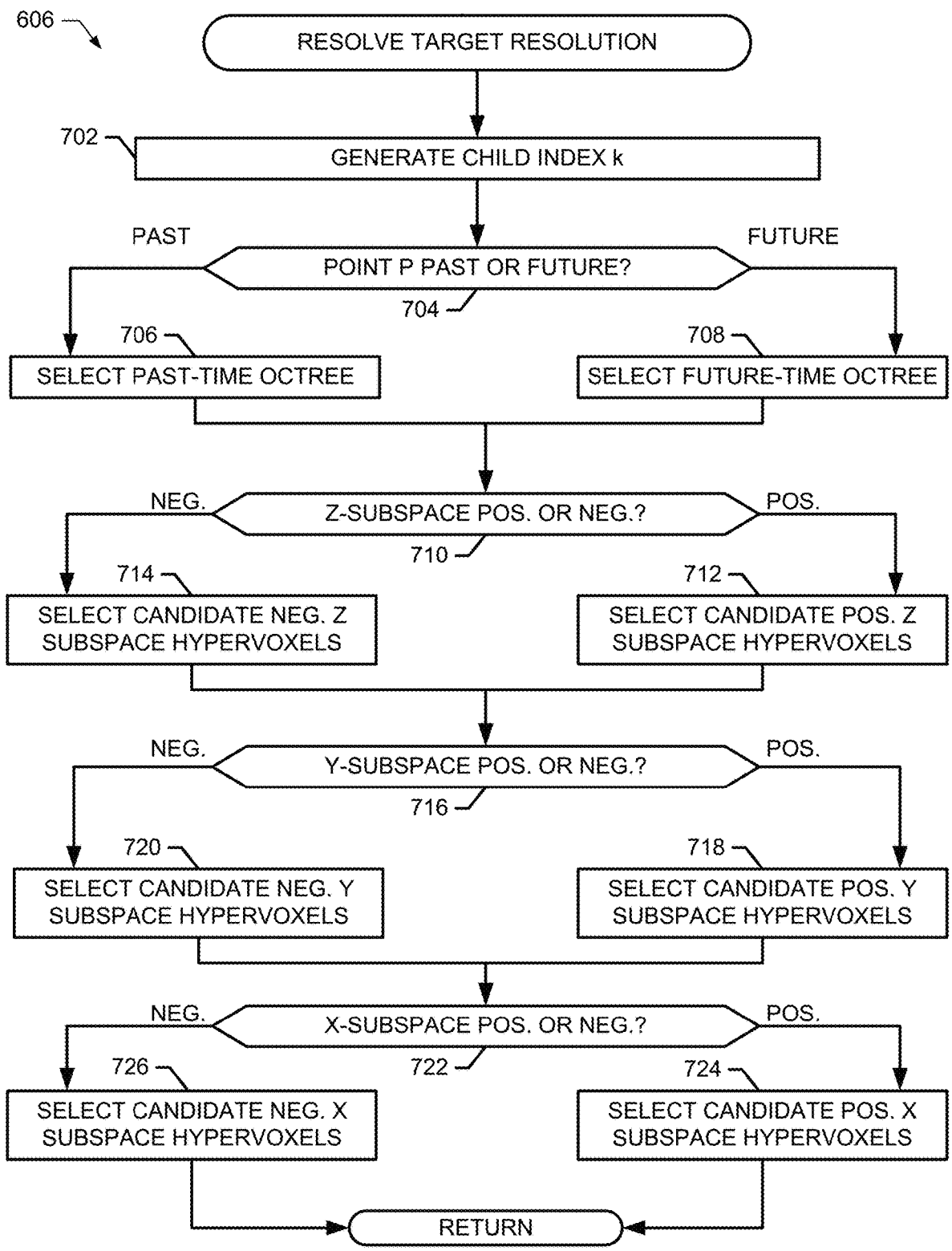

In the event the example STPA 222 determines that the resolution is not compatible or the resolution does not indicate a leaf node (block 604), the example index calculator 228 resolves a target resolution for node N (block 606). In other words, the example index calculator 228 determines the appropriate index with which to resolve a desired resolution. FIG. 7 includes additional detail in connection with resolving target resolution for node N (block 606) of FIG. 6. In the illustrated example of FIG. 7, the example index calculator 228 generates a child index value k (block 702), and evaluates new point P to determine whether it is associated with past temporal subspace or future temporal subspace relative to a hyperspace center point of node N (e.g., the example hyperspace center point 106 of FIG. 1) (block 704). The example index calculator 228 selects the example negative time octree 102 for past temporal subspace information (block 706) and selects the example positive time octree 104 for future subspace information (block 708). In other words, while initially there were sixteen (16) nodes/hypervoxels of interest to consider in view of the new input point P, half of those are eliminated from consideration in an efficient bit-wise test by the example index calculator 228.

The example index calculator 228 evaluates the new point P to determine whether it is associated with positive z-axis subspace or negative z-axis subspace (block 710). For positive z-axis subspace, the example index calculator 228 selects candidate positive z-axis hypervoxels (block 712), and for negative z-axis subspace, the example index calculator 228 selects candidate negative z-axis hypervoxels (block 714). Again, the bit-wise test by the example index calculator further reduces a number of candidate hypervoxels under consideration for an appropriate data entry. The example index calculator 228 evaluates the new point P to determine whether it is associated with positive y-axis subspace or negative y-axis subspace (block 716). For positive y-axis subspace, the example index calculator 228 selects candidate positive y-axis hypervoxels (block 718), and for negative y-axis subspace, the example index calculator 228 selects candidate negative y-axis hypervoxels (block 720). Again, the bit-wise test by the example index calculator further reduces a number of candidate hypervoxels under consideration for an appropriate data entry. The example index calculator 228 evaluates the new point P to determine whether it is associated with positive x-axis subspace or negative x-axis subspace (block 722). For positive x-axis subspace, the example index calculator 228 selects candidate positive x-axis hypervoxels (block 724), and for negative x-axis subspace, the example index calculator 228 selects candidate negative x-axis hypervoxels (block 726). Again, the bit-wise test by the example index calculator further reduces a number of candidate hypervoxels under consideration for an appropriate data entry.

Returning to the illustrated example of FIG. 6, the example child node manager 230 determines whether the node calculated above as index k has a corresponding child node (block 608). If not, then any attempted data entry would be unsuccessful as the target would represent entry in empty space and the example child node manager 230 creates and/or otherwise generates a child node at index k for node N (block 610). On the other hand, in the event the child node manager 230 determines that a child node exists for index k (block 608), then node N is set to the corresponding child index k (block 612). Control returns to block 604 to verify that the recursive steps to align the proper resolution are achieved and, if not, the example process may repeat at block 606. However, when the resolution is aligned or when a leaf node is identified (block 604), the example metadata manager 232 inserts metadata into the target hypervoxel (block 614).

Figure 8:
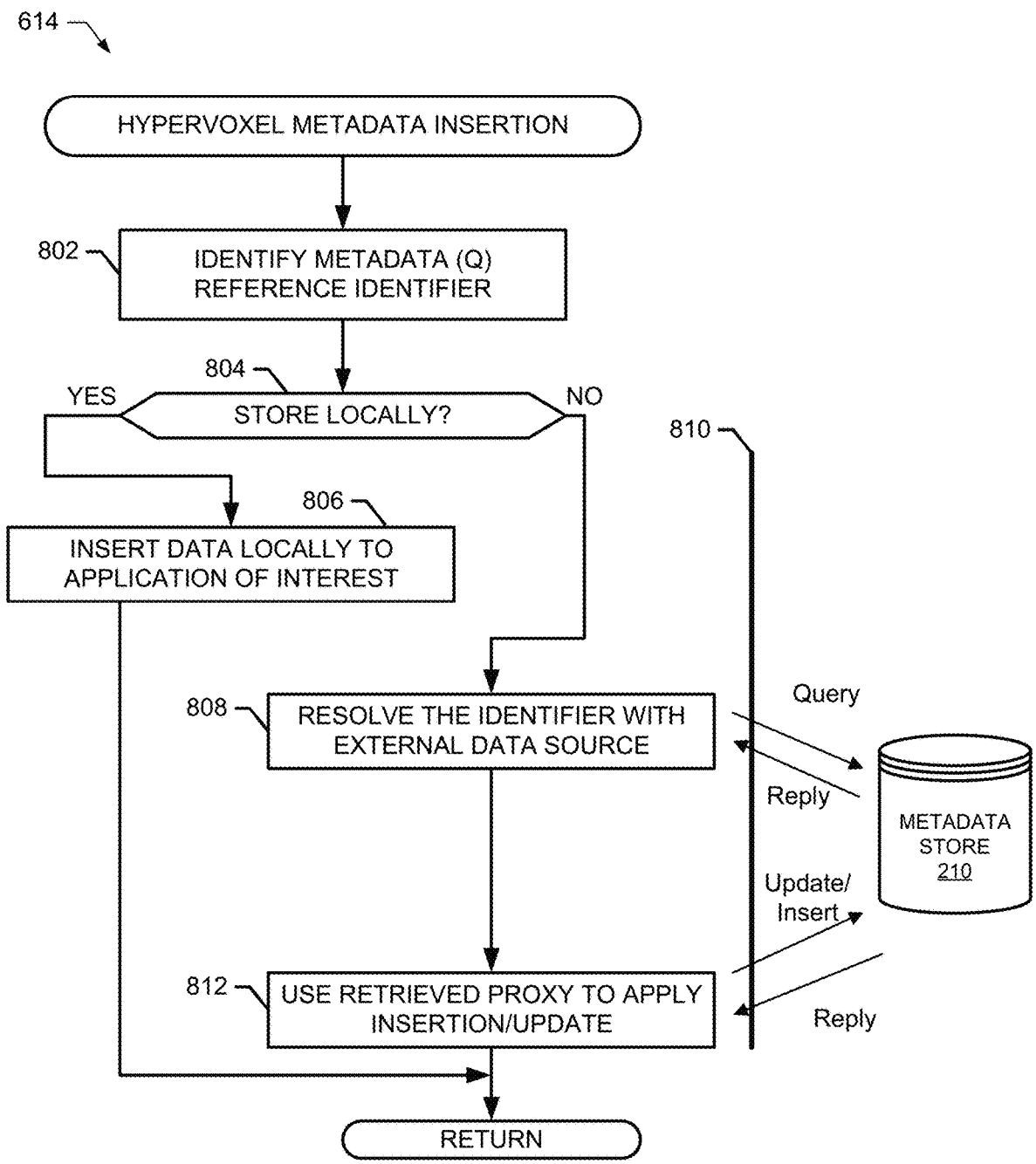

FIG. 8 includes additional detail of inserting metadata into the target hypervoxel (block 614) of FIG. 6. In the illustrated example of FIG. 8, the example metadata manager 232 retrieves and/or otherwise identifies (a) the metadata (Q) (having an identifier) and (b) the corresponding insertion index location for node N (block 802). If the metadata is to be stored locally (block 804), then the example metadata manager 232 inserts the data locally to the application/agent of interest (block 806). On the other hand, in view of the limited storage capabilities of one or more agents that may utilize the example hexacloud system 200, metadata and/or corresponding data repositories for data may be stored externally. In such circumstances, the example metadata manager 232 resolves the identifier with an external data source (block 808), such as the example metadata store 210. In some examples, efforts to resolve may occur via one or more network interfaces 810 with a query containing the identifier, for which the external data source provides a proxy. The example metadata manager 232 uses the retrieved and/or otherwise received proxy information to apply an informational insertion or update to an external data source (block 812), such as the example metadata store 210. Control then returns to block 616 of the illustrated example of FIG. 6 to determine whether a leaf node exists and, if not control returns to block 606. Otherwise, control returns to block 502 of FIG. 5.

Figure 9:
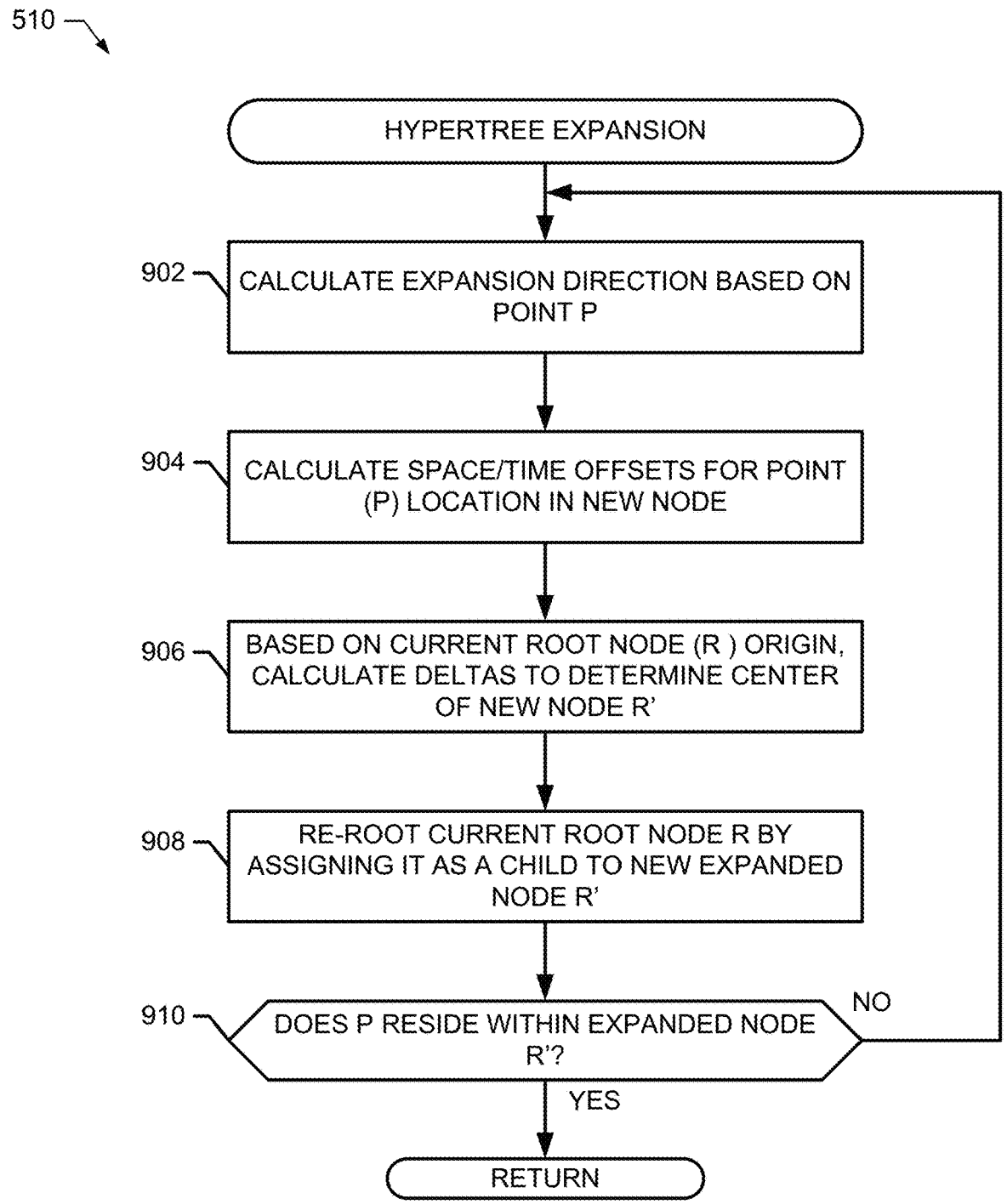

Returning to the illustrated example of FIG. 5, in the event the example STPA 222 determines that input point P includes spatiotemporal information that is outside the logical boundaries of a current root node (block 508), then the example expansion engine 234 facilitates hexatree expansion (block 510). FIG. 9 includes additional detail of hexatree expansion (block 510) of the illustrated example of FIG. 5. In the illustrated example of FIG. 9, it has been previously determined that input point P is not within the boundaries of the current hexanode, and a representation greater than that of the current/original hexanode is needed. Examples disclosed herein generate a new root node that doubles the spatial and temporal boundaries of the original root node using internal nodes and/or the leaf node associated with the input point P. However, although examples disclosed herein facilitate a doubling (or more) of the previous spatiotemporal boundaries, such expansion does not burden the physical memory resources of the application/agent. Instead, the new hexanode is another data structure that indexes the expanded spatiotemporal boundaries so that the application/agent memory management system (e.g., operating system) can populate physical memory only as needed for actual data, thereby avoiding memory consumption for empty space.

The example expansion direction analyzer 236 calculates an expansion direction based on the one or more spatiotemporal parameters of point P (block 902). For example, if the x-axis subspace is identified as exceeding the boundaries of the current node, then the new hexatree origin will be expanded with potential for sixteen (16) children. The example offset engine 238 calculates space/time offset values for a new location of point P (block 904). As described above in connection with FIG. 7, the example offset engine 238 may invoke the example index calculator 228 to identify an appropriate index for the expanded hexatree. Based on the identified index, the example offset engine 238 calculates deltas to determine a center point (e.g., a hyperspace center point) of the expanded root node (block 906) in a manner consistent with FIG. 3, described above. The new expanded root node may be designated as R' (R-prime) to distinguish it from the previous root node. The example re-root engine 240 re-roots the current root node (R) by assigning it as a child to the newly expanded root node R' (block 908). In the event the current iteration of the example program 510 of FIG. 9 does not expand far enough to accommodate the new input point P, as determined by the example STPA 222 (block 910), then control returns to block 902. Otherwise control returns to the illustrated example of FIG. 5.

Figure 10:
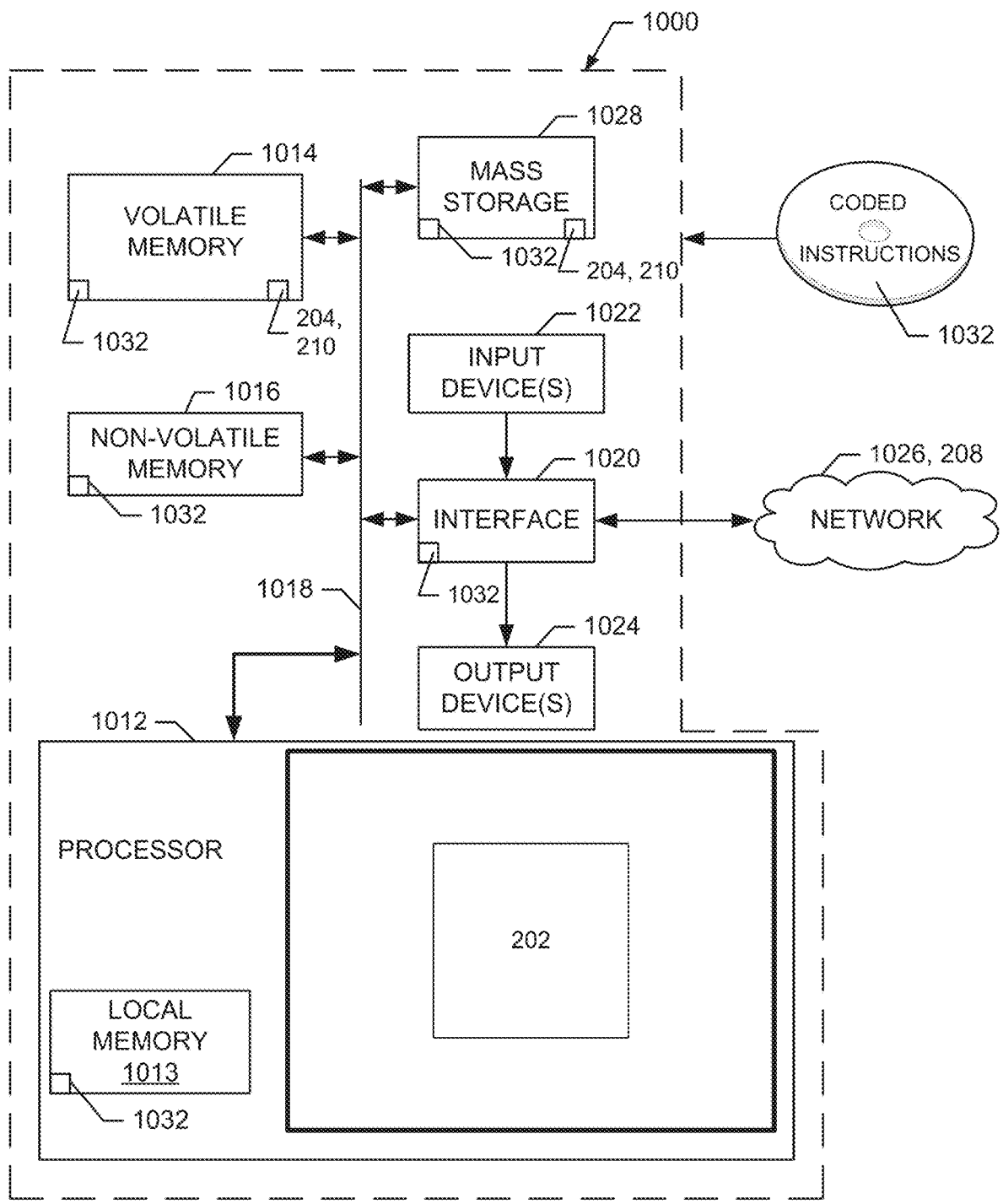
FIG. 10 is a block diagram of an example processor platform structured to execute the example machine readable instructions of FIGS. 4-9 to implement the example hexacloud system of FIGS. 1-3.

FIG. 10 is a block diagram of an example processor platform 1000 capable of executing the instructions of FIGS. 4-9 to implement the hexacloud system 200 of FIGS. 1-3. The processor platform 1000 can be, for example, a server, a personal computer, a mobile device (e.g., a cell phone, a smart phone, a tablet such as an iPad™), a personal digital assistant (PDA), an Internet appliance, a gaming console, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM). RAMBUS Dynamic Random Access Memory (RDRAM) and/or any type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a laser scanner, an environmental sensor (e.g., temperature, humidity, light, etc.) and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 4-9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture improve a data access efficiency for spatiotemporal data types. In particular, examples disclosed herein apply different degrees of symmetry to a hexatree data structure that, in part, facilitates faster bit-wise operations. Additionally, examples disclosed herein reduce platform memory utilization by preventing the storage and/or pre-allocation of physical memory for empty spaces of an area of interest.

Example methods, apparatus, systems and articles of manufacture to improve spatial-temporal data management are disclosed herein. Further examples and combinations thereof include the following.

Example 1 is an apparatus to improve access efficiency for spatiotemporal data, including a hypervoxel data structure generator to generate a root hexatree data structure having sixteen hypernodes, an octree manager to improve a spatiotemporal data access efficiency by generating a first degree of symmetry in the root hexatree, the octree manager to assign a first portion of the hypernodes to a positive temporal subspace and to assign a second portion of the hypernodes to a negative temporal subspace, and a quadtree manager to improve the spatiotemporal data access efficiency by generating a second degree of symmetry in the root hexatree, the quadtree manager to assign respective hypernodes of the positive temporal subspace and the negative temporal subspace to respective positive and negative spatial subspaces.

Example 2 includes the apparatus as defined in example 1, wherein the quadtree manager is to assign the respective positive and negative spatial subspaces to x-axis spatial dimensions, y-axis spatial dimensions and z-axis spatial dimensions.

Example 3 includes the apparatus as defined in example 1, wherein the hypervoxel data structure is to establish a hyperspace center of the root hexatree data structure.

Example 4 includes the apparatus as defined in example 3, wherein the first degree of symmetry is relative to the hyperspace center of the root hexatree data structure.

Example 4b includes the apparatus as defined in examples 2 or 3, further including a spatial-temporal point analyzer to extract at least one of spatial coordinate data or temporal data having a corresponding spatial resolution and a temporal resolution, respectively.

Example 5 includes the apparatus as defined in example 4, wherein the octree manager is to associate the first portion of the hypernodes with temporal data greater than a temporal value associated with the hyperspace center.

Example 6 includes the apparatus as defined in example 4, wherein the octree manager is to associate the second portion of the hypernodes with temporal data less than a temporal value associated with the hyperspace center.

Example 7 includes the apparatus as defined in example 3, wherein the quadtree manager is to associate the respective positive spatial subspaces with spatial data greater than a spatial value associated with the hyperspace center.

Example 8 includes the apparatus as defined in example 3, wherein the quadtree manager is to associate the respective negative spatial subspaces with spatial data less than a spatial value associated with the hyperspace center.

Example 9 includes the apparatus as defined in example 1, further including a spatial-temporal point analyzer to extract spatiotemporal data from an agent in response to a spatiotemporal data input request.

Example 10 includes the apparatus as defined in example 9, wherein the spatiotemporal data includes at least one of spatial coordinate data or temporal data.

Example 10b includes the apparatus as defined in examples 2, 3 or 9 further including an expansion direction analyzer to calculate an expansion direction for an expanded hexatree data structure in response to determining the spatiotemporal data input request is outside a spatial-temporal boundary of the root hexanode.

Example 11 includes the apparatus as defined in example 9, wherein the spatial-temporal point analyzer is to determine at least one of a spatial resolution of the spatiotemporal data or a temporal resolution of the spatiotemporal data.

Example 12 includes the apparatus as defined in example 9, wherein the spatial-temporal point analyzer is to calculate whether respective values of the spatiotemporal data input request are within spatial-temporal boundaries of the root hexanode.

Example 13 includes the apparatus as defined in example 12, further including an expansion direction analyzer to calculate an expansion direction for an expanded hexatree data structure in response to the spatial-temporal point analyzer determining that the spatiotemporal data input request is outside the spatial-temporal boundaries of the root hexatree.

Example 14 includes the apparatus as defined in example 13, further including an offset engine to calculate spatiotemporal offsets for a data insertion point for the spatiotemporal data input request to be placed in the expanded hexatree data structure.

Example 15 includes the apparatus as defined in example 13, further including an offset engine to calculate dimensions of the expanded hexatree data structure based on the spatiotemporal data input request.

Example 16 includes the apparatus as defined in example 13, further including a re-root engine to establish the expanded hexatree as a new root node, and to assign the root hexatree as a child of the expanded hexatree.

Example 17 is a computer implemented method to improve access efficiency for spatiotemporal data, including generating, by executing an instruction with a processor, a root hexatree data structure having sixteen hypernodes, improving a spatiotemporal data access efficiency by generating, by executing an instruction with the processor, a first degree of symmetry in the root hexatree, assigning, by executing an instruction with the processor, a first portion of the hypernodes to a positive temporal subspace, assigning, by executing an instruction with the processor, a second portion of the hypernodes to a negative temporal subspace; and improving the spatiotemporal data access efficiency by generating, by executing an instruction with the processor, a second degree of symmetry in the root hexatree, and assigning respective hypernodes of the positive temporal subspace and the negative temporal subspace to respective positive and negative spatial subspaces.

Example 18 includes the method as defined in example 17, further including assigning the respective positive and negative spatial subspaces to x-axis spatial dimensions, y-axis spatial dimensions and z-axis spatial dimensions.

Example 19 includes the method as defined in example 17, further including establishing a hyperspace center of the root hexatree data structure.

Example 20 includes the method as defined in example 19, wherein the first degree of symmetry is relative to the hyperspace center of the root hexatree data structure.

Example 21 includes the method as defined in example 20, further including associating the first portion of the hypernodes with temporal data greater than a temporal value associated with the hyperspace center.

Example 22 includes the method as defined in example 20, further including associating the second portion of the hypernodes with temporal data less than a temporal value associated with the hyperspace center.

Example 23 includes the method as defined in example 19, further including associating the respective positive spatial subspaces with spatial data greater than a spatial value associated with the hyperspace center.

Example 24 includes the method as defined in example 19, further including associating the respective negative spatial subspaces with spatial data less than a spatial value associated with the hyperspace center.

Example 25 includes the method as defined in example 17, further including extracting spatiotemporal data from an agent in response to a spatiotemporal data input request.

Example 26 includes the method as defined in example 25, wherein the spatiotemporal data includes at least one of spatial coordinate data or temporal data.

Example 27 includes the method as defined in example 25, further including determining at least one of a spatial resolution of the spatiotemporal data or a temporal resolution of the spatiotemporal data.

Example 28 includes the method as defined in example 25, further including calculating whether respective values of the spatiotemporal data input request are within spatial-temporal boundaries of the root hexanode.

Example 29 includes the method as defined in example 28, further including calculating an expansion direction for an expanded hexatree data structure in response to determining that the spatiotemporal data input request is outside the spatial-temporal boundaries of the root hexatree.

Example 30 includes the method as defined in example 29, further including calculating spatiotemporal offsets for a data insertion point for the spatiotemporal data input request to be placed in the expanded hexatree data structure.

Example 31 includes the method as defined in example 29, further including calculating dimensions of the expanded hexatree data structure based on the spatiotemporal data input request.

Example 32 includes the method as defined in example 29, further including establishing the expanded hexatree as a new root node, and to assign the root hexatree as a child of the expanded hexatree.

Example 33 is a tangible computer-readable medium comprising instructions which, when executed, cause a processor to at least generate a root hexatree data structure having sixteen hypernodes, improve a spatiotemporal data access efficiency by generating a first degree of symmetry in the root hexatree, assign a first portion of the hypernodes to a positive temporal subspace, assign a second portion of the hypernodes to a negative temporal subspace, and improve the spatiotemporal data access efficiency by generating a second degree of symmetry in the root hexatree, and assigning respective hypernodes of the positive temporal subspace and the negative temporal subspace to respective positive and negative spatial subspaces.

Example 34 includes the example tangible computer-readable medium as defined in claim 33, wherein the instructions, when executed, further cause the processor to assign the respective positive and negative spatial subspaces to x-axis spatial dimensions, y-axis spatial dimensions and z-axis spatial dimensions.

Example 35 includes the example tangible computer-readable medium as defined in claim 33, wherein the instructions, when executed, further cause the processor to establish a hyperspace center of the root hexatree data structure.

Example 36 includes the example tangible computer-readable medium as defined in claim 35, wherein the instructions, when executed, further cause the processor to identify the first degree of symmetry is relative to the hyperspace center of the root hexatree data structure.

Example 37 includes the example tangible computer-readable medium as defined in claim 36, wherein the instructions, when executed, further cause the processor to associate the first portion of the hypernodes with temporal data greater than a temporal value associated with the hyperspace center.

Example 38 includes the example tangible computer-readable medium as defined in claim 36, wherein the instructions, when executed, further cause the processor to associate the second portion of the hypernodes with temporal data less than a temporal value associated with the hyperspace center.

Example 39 includes the example tangible computer-readable medium as defined in claim 35, wherein the instructions, when executed, further cause the processor to associate the respective positive spatial subspaces with spatial data greater than a spatial value associated with the hyperspace center.

Example 40 includes the example tangible computer-readable medium as defined in claim 35, wherein the instructions, when executed, further cause the processor to associate the respective negative spatial subspaces with spatial data less than a spatial value associated with the hyperspace center.

Example 41 includes the example tangible computer-readable medium as defined in claim 33, wherein the instructions, when executed, further cause the processor to extract spatiotemporal data from an agent in response to a spatiotemporal data input request.

Example 42 includes the example tangible computer-readable medium as defined in claim 41, wherein the instructions, when executed, further cause the processor to include at least one of spatial coordinate data or temporal data as the spatiotemporal data.

Example 43 includes the example tangible computer-readable medium as defined in claim 41, wherein the instructions, when executed, further cause the processor to determine at least one of a spatial resolution of the spatiotemporal data or a temporal resolution of the spatiotemporal data.

Example 44 includes the example tangible computer-readable medium as defined in claim 41, wherein the instructions, when executed, further cause the processor to calculate whether respective values of the spatiotemporal data input request are within spatial-temporal boundaries of the root hexanode.

Example 45 includes the example tangible computer-readable medium as defined in claim 44, wherein the instructions, when executed, further cause the processor to calculate an expansion direction for an expanded hexatree data structure in response to determining that the spatiotemporal data input request is outside the spatial-temporal boundaries of the root hexatree.

Example 46 includes the example tangible computer-readable medium as defined in claim 45, wherein the instructions, when executed, further cause the processor to calculate spatiotemporal offsets for a data insertion point for the spatiotemporal data input request to be placed in the expanded hexatree data structure.

Example 47 includes the example tangible computer-readable medium as defined in claim 45, wherein the instructions, when executed, further cause the processor to calculate dimensions of the expanded hexatree data structure based on the spatiotemporal data input request.

Example 48 includes the example tangible computer-readable medium as defined in claim 45, % wherein the instructions, when executed, further cause the processor to establish the expanded hexatree as a new root node, and to assign the root hexatree as a child of the expanded hexatree.

Example 49 is a system to improve access efficiency for spatiotemporal data, including means for generating a root hexatree data structure having sixteen hypernodes, means for improving a spatiotemporal data access efficiency by generating a first degree of symmetry in the root hexatree, means for assigning a first portion of the hypernodes to a positive temporal subspace, means for assigning a second portion of the hypernodes to a negative temporal subspace, and means for improving the spatiotemporal data access efficiency by generating a second degree of symmetry in the root hexatree, and assigning respective hypernodes of the positive temporal subspace and the negative temporal subspace to respective positive and negative spatial subspaces.

Example 50 includes the system as defined in example 49, further including means for assigning the respective positive and negative spatial subspaces to x-axis spatial dimensions, y-axis spatial dimensions and z-axis spatial dimensions.

Example 51 includes the system as defined in example 49, further including means for establishing a hyperspace center of the root hexatree data structure.

Example 52 includes the system as defined in example 51, wherein the first degree of symmetry is relative to the hyperspace center of the root hexatree data structure.

Example 53 includes the system as defined in example 52, further including means for associating the first portion of the hypernodes with temporal data greater than a temporal value associated with the hyperspace center.

Example 54 includes the system as defined in example 52, further including means for associating the second portion of the hypernodes with temporal data less than a temporal value associated with the hyperspace center.

Example 55 includes the system as defined in example 51, further including means for associating the respective positive spatial subspaces with spatial data greater than a spatial value associated with the hyperspace center.

Example 56 includes the system as defined in example 51, further including means for associating the respective negative spatial subspaces with spatial data less than a spatial value associated with the hyperspace center.

Example 57 includes the system as defined in example 49, further including means for extracting spatiotemporal data from an agent in response to a spatiotemporal data input request.

Example 58 includes the system as defined in example 57, wherein the spatiotemporal data includes at least one of spatial coordinate data or temporal data.

Example 59 includes the system as defined in example 57, further including means for determining at least one of a spatial resolution of the spatiotemporal data or a temporal resolution of the spatiotemporal data.

Example 60 includes the system as defined in example 57, further including means for calculating whether respective values of the spatiotemporal data input request are within spatial-temporal boundaries of the root hexanode.

Example 61 includes the system as defined in example 60, further including means for calculating an expansion direction for an expanded hexatree data structure in response to determining that the spatiotemporal data input request is outside the spatial-temporal boundaries of the root hexatree.

Example 62 includes the system as defined in example 61, further including means for calculating spatiotemporal offsets for a data insertion point for the spatiotemporal data input request to be placed in the expanded hexatree data structure.

Example 63 includes the system as defined in example 61, further including means for calculating dimensions of the expanded hexatree data structure based on the spatiotemporal data input request.

Example 64 includes the system as defined in example 61, further including means for establishing the expanded hexatree as a new root node, and to assign the root hexatree as a child of the expanded hexatree.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
memory;
instructions in the apparatus; and
processor circuitry to execute the instructions to at least:
in response to a first determination that a write request associated with a spatio-temporal data structure includes a data point to be added to the spatio-temporal data structure, extract spatio-temporal data from the data point;
determine whether the spatio-temporal data is included in a boundary of a root node of the spatio-temporal data structure; and
at least one of expand the spatio-temporal data structure or insert the spatio-temporal data in the spatio-temporal data structure based on a second determination of whether the spatio-temporal data is included in the boundary.

2. The apparatus of claim 1, wherein the spatio-temporal data structure is a root hexatree data structure, and the processor circuitry is to execute the instructions to:
generate the root hexatree data structure to have a plurality of hypernodes;
assign a first portion of the plurality of the hypernodes to have a respective positive temporal subspace; and
assign a second portion of the plurality of the hypernodes to have a respective negative temporal subspace.

3. The apparatus of claim 2, wherein the processor circuitry is to execute the instructions to:
identify a hyperspace center of the root hexatree data structure;
associate the respective positive temporal subspaces with first temporal data greater than a temporal value associated with the hyperspace center; and
associate the respective negative temporal subspaces with second temporal data less than the temporal value associated with the hyperspace center.

4. The apparatus of claim 1, wherein the spatio-temporal data structure is a root hexatree data structure, and the processor circuitry is to execute the instructions to:
generate the root hexatree data structure to have a plurality of hypernodes;
assign a first portion of the plurality of the hypernodes to have a respective positive spatial subspace; and
assign a second portion of the plurality of the hypernodes to have a respective negative spatial subspace.

5. The apparatus of claim 4, wherein the processor circuitry is to execute the instructions to:
identify a hyperspace center of the root hexatree data structure;
associate the respective positive spatial subspaces with first spatial data greater than a spatial value associated with the hyperspace center; and
associate the respective negative spatial subspaces with second spatial data less than the spatial value associated with the hyperspace center.

6. The apparatus of claim 1, wherein the spatio-temporal data structure is a first hexatree data structure, and the processor circuitry is to execute the instructions to, in response to a third determination that the spatio-temporal data is not included in the boundary:
determine an expansion direction for a second hexatree data structure to be associated with the first hexatree data structure;
generate at least one of a spatial offset value or a temporal offset value for a new location of the spatio-temporal data in the second hexatree data structure;

identify a hyperspace center point of the second hexatree data structure based on a space-time delta; and
associate the first hexatree data structure as a child node to the second hexatree data structure.

7. The apparatus of claim 1, wherein the processor circuitry is to execute the instructions to:
receive the spatio-temporal data from an agent; and
in response to a third determination that the spatio-temporal data is included in the boundary:
determine a storage location for metadata associated with the spatio-temporal data;
in response to a fourth determination that the storage location is local to the agent, store the metadata into storage of the agent; and
in response to a fifth determination that the storage location is in storage separate from the agent, store the metadata in a database or a networked cloud storage.

8. An apparatus comprising:
spatial-temporal point analyzer hardware circuitry to:
in response to a first determination that a write request associated with a spatio-temporal data structure includes a data point to be added to the spatio-temporal data structure, extract spatio-temporal data from the data point; and
determine whether the spatio-temporal data is included in a boundary of a root node of the spatio-temporal data structure; and
at least one of expansion engine hardware circuitry to expand the spatio-temporal data structure or insertion engine hardware circuitry to insert the spatio-temporal data in the spatio-temporal data structure based on a second determination of whether the spatio-temporal data is included in the boundary.

9. The apparatus of claim 8, wherein the spatio-temporal data structure is a root hexatree data structure, and further including hexacloud data structure generator hardware circuitry to:
generate the root hexatree data structure to have a plurality of hypernodes;
assign a first portion of the plurality of the hypernodes to have a respective positive temporal subspace; and
assign a second portion of the plurality of the hypernodes to have a respective negative temporal subspace.

10. The apparatus of claim 9, wherein the hexacloud data structure generator hardware circuitry is to:
identify a hyperspace center of the root hexatree data structure;
associate the respective positive temporal subspaces with first temporal data greater than a temporal value associated with the hyperspace center; and
associate the respective negative temporal subspaces with second temporal data less than the temporal value associated with the hyperspace center.

11. The apparatus of claim 8, wherein the spatio-temporal data structure is a root hexatree data structure, and further including hexacloud data structure generator hardware circuitry to:
generate the root hexatree data structure to have a plurality of hypernodes;
assign a first portion of the plurality of hypernodes to have a respective positive spatial subspace; and
assign a second portion of the plurality of hypernodes to have a respective negative spatial subspace.

12. The apparatus of claim 11, wherein the hexacloud data structure generator hardware circuitry is to:
identify a hyperspace center of the root hexatree data structure;
associate the respective positive spatial subspaces with first spatial data greater than a spatial value associated with the hyperspace center; and
associate the respective negative spatial subspaces with second spatial data less than the spatial value associated with the hyperspace center.

13. The apparatus of claim 8, wherein the spatio-temporal data structure is a first hexatree data structure, and the expansion engine hardware circuitry is to, in response to a third determination that the spatio-temporal data is not included in the boundary:
determine an expansion direction for a second hexatree data structure to be associated with the first hexatree data structure;
generate at least one of a spatial offset value or a temporal offset value for a new location of the spatio-temporal data in the second hexatree data structure;
identify a hyperspace center point of the second hexatree data structure based on a space-time delta; and
associate the first hexatree data structure as a child node to the second hexatree data structure.

14. The apparatus of claim 8, wherein the insertion engine hardware circuitry is to, in response to a receipt of the spatio-temporal data from an agent and in response to a third determination that the spatio-temporal data is included in the boundary:
determine a storage location for metadata associated with the spatio-temporal data;
in response to a fourth determination that the storage location is local to the agent, store the metadata into storage of the agent; and
in response to a fifth determination that the storage location is in storage separate from the agent, store the metadata in a database or a networked cloud storage.

15. At least one non-transitory computer readable storage medium comprising instructions that, when executed, cause processor circuitry to at least:
in response to a first determination that a write request associated with a spatio-temporal data structure includes a data point to be added to the spatio-temporal data structure, extract spatio-temporal data from the data point;
determine whether the spatio-temporal data is included in a boundary of a root node of the spatio-temporal data structure; and
at least one of expand the spatio-temporal data structure or insert the spatio-temporal data in the spatio-temporal data structure based on a second determination of whether the spatio-temporal data is included in the boundary.

16. The at least one non-transitory computer readable storage medium of claim 15, wherein the spatio-temporal data structure is a root hexatree data structure, and the instructions, when executed, cause the processor circuitry to:
generate the root hexatree data structure to have a plurality of hypernodes;
assign a first portion of the plurality of the hypernodes to have a respective positive temporal subspace; and
assign a second portion of the plurality of the hypernodes to have a respective negative temporal subspace.

17. The at least one non-transitory computer readable storage medium of claim 16, wherein the instructions, when executed, cause the processor circuitry to:
- identify a hyperspace center of the root hexatree data structure;
- associate the respective positive temporal subspaces with first temporal data greater than a temporal value associated with the hyperspace center; and
- associate the respective negative temporal subspaces with second temporal data less than the temporal value associated with the hyperspace center.

18. The at least one non-transitory computer readable storage medium of claim 15, wherein the spatio-temporal data structure is a root hexatree data structure, and the instructions, when executed, cause the processor circuitry to:
- generate the root hexatree data structure to have a plurality of hypernodes;
- assign a first portion of the plurality of the hypernodes to have a respective positive spatial subspace; and
- assign a second portion of the plurality of the hypernodes to have a respective negative spatial subspace.

19. The at least one non-transitory computer readable storage medium of claim 18, wherein the instructions, when executed, cause the processor circuitry to:
- identify a hyperspace center of the root hexatree data structure;
- associate the respective positive spatial subspaces with first spatial data greater than a spatial value associated with the hyperspace center; and
- associate the respective negative spatial subspaces with second spatial data less than the spatial value associated with the hyperspace center.

20. The at least one non-transitory computer readable storage medium of claim 15, wherein the spatio-temporal data structure is a first hexatree data structure, and the instructions, when executed, cause the processor circuitry to, in response to a third determination that the spatio-temporal data is not included in the boundary:
- determine an expansion direction for a second hexatree data structure to be associated with the first hexatree data structure;
- generate at least one of a spatial offset value or a temporal offset value for a new location of the spatio-temporal data in the second hexatree data structure;
- identify a hyperspace center point of the second hexatree data structure based on a space-time delta; and
- associate the first hexatree data structure as a child node to the second hexatree data structure.

21. The at least one non-transitory computer readable storage medium of claim 15, wherein the instructions, when executed, cause the processor circuitry to:
- receive the spatio-temporal data from an agent; and
- in response to a third determination that the spatio-temporal data is included in the boundary:
  - determine a storage location for metadata associated with the spatio-temporal data;
  - in response to a fourth determination that the storage location is local to the agent, store the metadata into storage of the agent; and
  - in response to a fifth determination that the storage location is in storage separate from the agent, store the metadata in a database or a networked cloud storage.

* * * * *